United States Patent
Sakaki et al.

(10) Patent No.: US 7,487,328 B2
(45) Date of Patent: *Feb. 3, 2009

(54) STORAGE APPARATUS HAVING VIRTUAL-TO-ACTUAL DEVICE ADDRESSING SCHEME

(75) Inventors: Hidetoshi Sakaki, Odawara (JP); Yoshihiro Asaka, Odawara (JP); Masami Maeda, Odawara (JP); Masaru Tsukada, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/971,029

(22) Filed: Jan. 8, 2008

(65) Prior Publication Data

US 2008/0155128 A1    Jun. 26, 2008

Related U.S. Application Data

(63) Continuation of application No. 10/998,780, filed on Nov. 30, 2004, now Pat. No. 7,337,299.

(30) Foreign Application Priority Data

Oct. 7, 2004    (JP) .............................. 2004-295066

(51) Int. Cl.
*G06F 12/10* (2006.01)
(52) U.S. Cl. .................. 711/203; 711/115; 711/203
(58) Field of Classification Search .................. None
See application file for complete search history.

(56) References Cited

U.S. PATENT DOCUMENTS

| | | | |
|---|---|---|---|
| 5,546,557 A * | 8/1996 | Allen et al. ................. | 711/111 |
| 6,105,103 A | 8/2000 | Courtright, II et al. | |
| 6,519,678 B1 | 2/2003 | Basham et al. | |
| 6,622,177 B1 | 9/2003 | Eilert et al. | |
| 6,834,324 B1 * | 12/2004 | Wood ......................... | 711/111 |
| 7,020,758 B2 * | 3/2006 | Fisk ........................... | 711/172 |
| 7,158,973 B2 * | 1/2007 | Mandal et al. ................ | 707/10 |
| 2002/0161971 A1 * | 10/2002 | Dimitri et al. ............... | 711/114 |
| 2004/0054850 A1 * | 3/2004 | Fisk ............................ | 711/112 |
| 2004/0133575 A1 | 7/2004 | Farmer et al. | |
| 2004/0172577 A1 | 9/2004 | Tan et al. | |

OTHER PUBLICATIONS

Toigo Partners International LLC, "Introducing Time Addressable Storage: A Common-Sense Approach To Data Protection", http://www.revivio.com, May 28, 2003, XP002339430, p 2, lines 10-17, p. 8 last paragraph, p. 11, last paragraph.

* cited by examiner

*Primary Examiner*—Jack A Lane
(74) *Attorney, Agent, or Firm*—Antonelli, Terry, Stout & Kraus, LLP.

(57) ABSTRACT

A storage apparatus includes a storage unit and a controller, wherein control of inputting/outputting data from/to a device provided in said storage unit is executed in accordance with a request received by said storage apparatus. An actual device of the storage apparatus corresponds to a virtual device which is external to said storage apparatus. The controller operates to perform a process for mapping an actual device address corresponding to a virtual device address, in accordance with a specification of the actual device to be mounted or unmounted to correspond to the virtual device, and storing and retaining mapping information obtained from the mapping in a first table. The controller also performs data input/output process for receiving, an access request for data input/output in which said virtual device address is specified, obtaining the actual device address mapped to said specified virtual device address in said first table, and accessing the actual device by said obtained actual device address.

9 Claims, 21 Drawing Sheets

FIG. 8

⟨Virtual-Actual Device Address Mapping Table⟩

| Virtual Device Address | Actual Device Address |
|---|---|
| #0 | #c |
| #1 | #h |
| #2 | #– |
| #3 | #– |
| . | . |
| . | . |
| #n | #– |

FIG. 9

⟨Actual Device Identification Information Table⟩

| Actual Device Address | Actual Device Identification Information |
|---|---|
| #a | DevA |
|  | 0 |
| #b | DevB |
|  | 0 |
| #c | DevC |
|  | 0 |
| . | . |
| . | . |
| . | . |
| #nn | . |
|  | . |

(Second column split: Actual Device Identification Information / Generation Information)

FIG. 18

| Virtual Device Address | Actual Device Address | Actual Device Identification Information | Generation Information |
|---|---|---|---|
| #0 | #a | DevA | 0 |
| #0 | #a | DevA | 1 |
| #0 | #a | DevA | 2 |
| ... | ... | ... | ... |
| #0 | #a | DevA | g |
| ... | ... | ... | ... |

<Back Up Only>

<Cache-Resident Function>

STORAGE APPARATUS HAVING VIRTUAL-TO-ACTUAL DEVICE ADDRESSING SCHEME

CROSS-REFERENCE TO RELATED APPLICATION

This application is a continuation of U.S. application Ser. No. 10/998,780, filed Nov. 30, 2004 now U.S. Pat. No. 7,337,299, and which present application claims priority from Japanese patent application No. JP 2004-295066 filed on Oct. 7, 2004, the content of which is hereby incorporated by reference into this application.

BACKGROUND OF THE INVENTION

The present invention relates to a storage apparatus (also known as a disk array apparatus or storage subsystem) which controls storing of data with respect to a storage unit such as a hard disk drive (hereinafter abbreviated as "HDD"), and particularly to a technique for utilizing and controlling system configuration definition information such as device addresses for utilizing storage apparatuses in a computer system configured by including the storage apparatus and a host computer (hereinafter abbreviated as "host") which requests data input and output with respect to the storage apparatus.

With increase in an amount of data handled in a computer system, capacity of a storage area provided by the storage apparatus is also made high in a computer system configured by including a storage apparatus which is communicably connected to a host computer of a user side via a network etc.

Before utilization of the storage apparatus, the host side is required to have I/O (input/output) configuration information as the system configuration definition, in order to perform accesses to devices provided in a storage area of the storage apparatus which is connected to a host. Conventionally, for example in mainframe-based connection, the host has retained, as the I/O configuration information, the device addresses which are control information used to uniquely specify an object in accessing the devices provided in the storage apparatus, so that the device addresses correspond one-on-one to physical structures of a side of the storage apparatus. That is, all the device addresses handled in the storage apparatus are also retained on the host side. In the access of the storage apparatus to the device from the host, the host specifies a device address and issues a request (command); and, according to the specified device address, the storage apparatus accesses a physical storage area which is provided on a HDD corresponding to the device, in order to perform an input/output process such as read/write of data. Note that the "device" indicates a unit of a physical or logical storage volume which is reserved in the storage area provided by, for example, the HDD in the storage apparatus.

Also, in conventional storage apparatus and computer system, in addition to the access (disk access) performed from the host to devices which are provided on the HDD of the storage apparatus, an access (tape access) is made to a magnetic tape unit which is connected in the system, in order to, for example, back up the data. When the data of the device of the storage apparatus is to be inputted to and outputted from the magnetic tape unit, the magnetic tape is utilized by being appropriately mounted on the address of the magnetic tape unit. The magnetic tape which is mounted on the magnetic tape unit is identified by identification information such as volume serial numbers (VOLSER). Since the above-described magnetic tape is mounted, the data of the device provided in the storage apparatus can be inputted to and outputted from the area of the magnetic tape by specifying the address of the magnetic tape unit from the host and the storage apparatus.

SUMMARY OF THE INVENTION

As the capacity etc. of said storage apparatus is made high, the device addresses which can be controlled or are necessary in the storage apparatus tend to increase. Also, it is thought that the number of storage apparatuses capable of being connected to the host and the number of logical partitions provided in the host side are increased.

In the one-on-one fixed configuration definition between the host side and the storage apparatus side which are included in the conventional configuration in accordance with the above-described tendency, the number of device addresses required to be retained and controlled in the host side also increases. For example, if the number of device addresses handled in the storage apparatus increases by thousands or ten thousands, the same number of the device addresses has to be controlled in the host side. Since the number of the device addresses retained in the host side increases, there are the problems that the control thereof becomes difficult and used resources are also increased.

By retaining the configuration definition in the host side, there is attained a state in which the devices in the storage apparatus can be always accessed from the host side. However, some of information and data stored in disks of the storage apparatus are not required to be always accessible from the host side depending on the contents thereof. For example, it is the case of the device accessed merely temporarily from the host side in the storage apparatus. The configuration definition of the device, in which such a type of information and data are stored, is not required to be fixedly retained in the host side similarly to the conventional configuration.

The present invention has been made in view of the above problems, and an object of the present invention is to provide a technique in which, even when the number of devices and the number of device addresses handled in the storage apparatus side increases, it is possible to access all the devices in the storage apparatus and concurrently save used resources by simple control of the system configuration definition information without adding the device addresses retained as the I/O configuration information on the host side in accordance with the arrangement in the storage apparatus side.

Outlines of representative ones of inventions disclosed in the present application will be briefly described as follows. In order to accomplish the above-described object, a storage apparatus of the present invention comprises: a storage unit such as an HDD; and a controller for executing control of storing data in the storage unit, wherein control of inputting/outputting data from/to a device (storage volume) such as a host computer provided in said storage unit is executed in accordance with a request (command) from an external device such as a host computer connected via a communication means, and the storage apparatus has the following technical means.

The storage apparatus of the present invention includes a concept of use by mounting the conventional magnetic tape when I/O configuration information (device address) for an access to a device (referred to as "actual device" for identification) provided in the storage apparatus is utilized and controlled in the computer system configured so as to include the present storage apparatus and the external device such as a host. That is, unlike a conventional manner in which the system configuration definition in the host is made to fixedly correspond one-on-one to a physical configuration (device configuration) of the storage apparatus side, a device (referred to as "virtual device" for identification) other than the actual device, which is handled on the storage apparatus side, is handled on a side of the external device such as a host in a virtual manner and there is provided a means (referred to as "device mounting means") utilized by mounting, to the virtual device, the actual device handled on the storage apparatus side. The side of the external device such as a host accesses the storage apparatus side according to a virtual device address corresponding to the virtual device, and the storage apparatus side accesses an actual device in accordance with an actual device address corresponding to the actual device mounted to the virtual device. So as to correspond to a utilizing configuration of the device, the side of the external device such as a host sets and retains the necessary number of virtual device addresses. The controller executes RAID control to a logical device provided on a group of storage units and, particularly, the logical device corresponds to the actual device.

The above-described device mounting means is configured, for example, so as to issue, from the host side, a request (mounting request/unmounting request) for performing a mounting or unmounting process between the virtual device and the actual device and to perform, on the storage apparatus side, a mounting or unmounting process between the virtual device and the actual device in accordance with said command. Accordingly, as the system configuration definition, it is sufficient for implement that the host side retains, as I/O (input/output) configuration information, the virtual device addresses few in number than that of the device addresses handled in the storage apparatus side and that, by appropriately mounting/unmounting of the actual devices to/from the virtual devices, accesses to all the actual devices in the storage apparatus are ensured.

The mounting/unmounting of the virtual device and the actual device by the device mounting means is performed by correlating (mapping) the virtual device and the actual device with (to) the virtual device address and the actual device address using the controller of the storage apparatus. In accordance with the mounting request from the host etc., as the mounting process, the controller maps the actual device address to the specified virtual device address, and retains the mapping information in a memory of the controller. During an operation of the storage apparatus, the mapping information is retained so as to be referenced. When the controller is accessed from the host or the like by specifying the virtual device address, the controller refers to said mapping information to obtain the corresponding actual device address from the specified virtual device address, and accesses the actual device, i.e., a storage area of the storage unit side by the obtained actual device address. Also, in accordance with an unmounting request from the host or the like, as an unmounting process, the controller nullifies the mapping of the actual device address which is in a mounting state with respect to the specified virtual device address, and retains the mapping information in the memory of the controller.

As the above-described device mounting means, a utilization program (software for utilizing the storage apparatus) of the host side is provided with a means (command issuing program) for setting and retaining the virtual device address as the I/O configuration information and for issuing, to the storage apparatus side, various requests (commands) related to the mounting of the device. The above-described requests include a mounting request for mounting the actual device to the virtual device, an unmounting request for unmounting the actual device from the virtual device, various requests for inputting or outputting data to or from the virtual device in the mounting state, and a request (mounting information displaying request) for displaying or obtaining, on the host side, the information (mounting information) relating to the mounting state of the device.

As the above-described device mounting means, the controller on the storage apparatus side, particularly, a processing unit such as a channel adapter performing a communication interface process with the external device such as a host via a communication means performs processes relating to the device mountings corresponding to various requests given from the host side, and stores, in a memory such as a shared memory of the controller, the control information relating to the device mounting, such as the above-described mapping information. As the control information relating to device mounting, the controller controls the information including a first table (virtual-actual device address mapping table) correlating a plurality of virtual device addresses and actual device addresses with one another, and a second table (actual device address identification table) correlating actual device addresses for accesses to a plurality of actual devices provided in the storage apparatus and actual device identification information which is identification information assigned from the host or the like to the corresponding actual devices.

Also, as a mounting process performed based on the mounting request given from the host or the like, the controller performs a process for mapping the actual device address, which is searched from the second table based on the virtual device address and the actual device identification information specified by said request, to the specified virtual device address in the first table. The above-described mounting request includes, for example, the specification of the virtual device address and actual device identification information.

Also, based on the request for data input/output request such as read/write from the host or the like, the controller obtains, in the first table, the actual device address, which is in a mounting state and corresponds to the virtual device address specified in said request, and performs a data input/output process to the actual device corresponding to the obtained actual device address.

Also, as an unmounting process performed based on the unmounting request from the host or the like, the controller performs a process for nullifying, in the first table, the correlation of the actual device address and the virtual device address specified by the request. The above-described unmounting request includes, for example, the specification of the virtual device address.

Also, based on a mounting information displaying or obtaining request from the host or the like, the controller performs a process for reading out the mounting information from, for example, the first and second tables and transmitting the information as a response. The above-described request includes, for example, the specification of a display object (for example, the entirety or a part of the mounting information).

The controller is configured so as to include, for example, a channel adapter, a disk adapter for controlling data input/output performed to the storage unit, a shared memory for retaining the control information, and a cache memory for storing transferred data. The channel adapter receives a request (e.g., mounting request) relating to the device mounting from the host or the like, and performs a process corresponding thereto. The control information including the first and second tables is constructed and retained in the shared memory which can be accessed from the channel adapter, and the data for read/write etc. performed to the virtual device is stored in the cache memory. The disk adapter makes an access for data input/output to the above-described actual device in accordance with the actual device address.

Also, for example, at a predetermined timing, e.g., at a time of turning on power of the storage apparatus, the storage apparatus reads out the first and second tables from the system area or the like in the storage unit side and loads them into the memory of the controller so as to be constructed. Further, at a predetermined timing, e.g., at a time of turning off power of the storage apparatus, the storage apparatus stores (saves) and reserves them from the memory of the controller into the system area or the like on the storage unit side. Also, in accordance with the request given from the host or the like, the controller may write the actual device identification information to the second table and concurrently perform a process for writing the information also to an area (fixed area) of the storage unit side. At a time of constructing the first and second tables in the memory of the controller, there is performed a process for reading out the actual device identification information from the area of the storage unit side so as to reflect the information to the tables.

Also, the procedure for utilizing the actual device from the host is, for example, as follows. First, on the host side, the mounting request for mounting the object actual device on a virtual device is issued to the storage apparatus. Next, in the storage apparatus, a process for mounting the actual device on the specified virtual device is performed. Then, from the host side, a data input/output access is made to the virtual device in a mounting state. Then, from the host side, a request for unmounting the actual device to the virtual device which is in a mounting state is issued. Then, the storage apparatus performs a process for unmounting the actual device to the specified virtual device. These processes may be performed continuously in a set, or may be performed individually.

Also, even in a unit or device other than said host, in the same manner as the above description, an administration terminal (SVP) connected to the storage apparatus requests, to the storage apparatus, the process relating to the device mounting, and, in accordance with said request, the process relating to the device mounting is performed by the controller of the storage apparatus in the same manner.

Effects obtained from representative ones of inventions disclosed by the present application will be briefly described as follows.

According to the present invention, even when the number of devices and that of device addresses handled on the storage apparatus side are increased, all the devices in the storage apparatus can be accessed and the used resources can be saved by simple control of the system configuration definition information, without adding the device addresses retained as the I/O configuration information on the host side in accordance with the arrangement on the storage apparatus side.

BRIEF DESCRIPTION OF THE DRAWINGS

FIG. 8 is a diagram showing an example of a virtual-actual device address mapping table in a storage apparatus according to a first embodiment of the present invention.

FIG. 9 is a diagram showing an example of an actual device address identification table in a storage apparatus according to a first embodiment of the present invention.

FIG. 18 is a view showing a setting example of a table provided in a shared memory for the case in which generation management corresponding to FIG. 17 is performed in a storage apparatus according to a second embodiment of the present invention.

DESCRIPTION OF THE PREFERRED EMBODIMENTS

Figure 1:
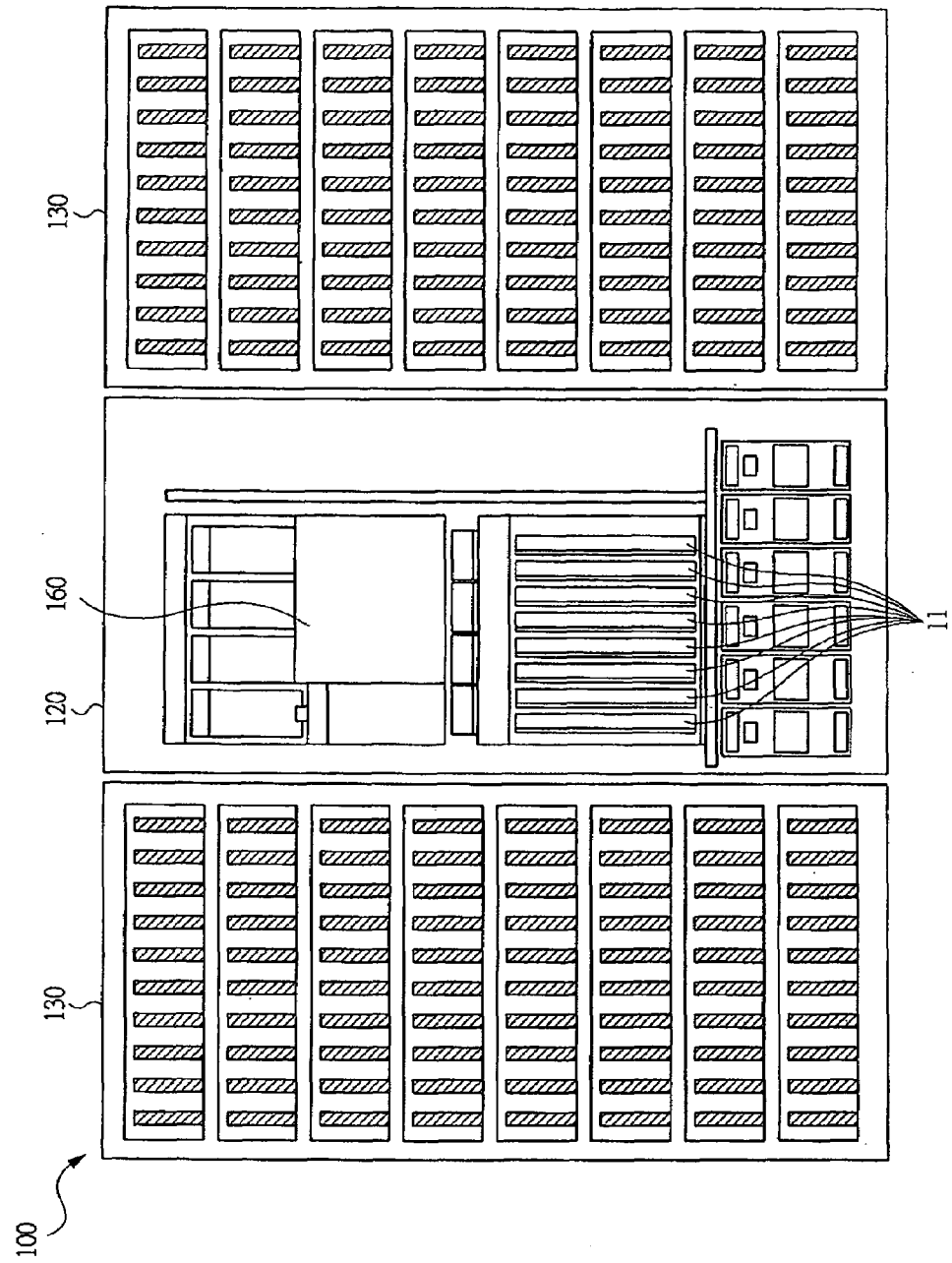
FIG. 1 is a view showing an external configuration of hardware in a storage apparatus according to a first embodiment of the present invention.

Hereinafter, embodiments of the present invention will be detailed based on the drawings. Note that the same members are denoted in principle by the same reference numeral throughout all the drawings for describing the embodiments and the repetitive description thereof will not be omitted.

First Embodiment

FIGS. 1 to 16 are diagrams for explaining a storage apparatus according to a first embodiment of the present invention. The first embodiment includes a device mounting means in a computer system to which a host and a storage apparatus are connected, handles a virtual device on a side of a host, and shows a basic configuration and process of a device mounting method in which the actual device handled in the storage apparatus is mounted on and accessed to the virtual device as occasion demands. The host side has few pieces of I/O configuration information (virtual device address) than a side of the storage apparatus. Note that processes relating to a device mounting shown in each embodiment are independent from a process for mounting a magnetic tape in a conventional magnetic tape unit.

<Hardware Configuration>

First, the entire configuration of the storage apparatus of the first embodiment will be explained. Then, a characteristic process of the present invention will be explained. FIG. 1 shows a view showing an external configuration of hardware of a storage apparatus 100 according to the first embodiment. Particularly, the configuration of the storage apparatus 100 viewed from the front is shown. This hardware configuration is common to the respective embodiments, and the respective embodiments are different from one another in a manner of utilizing software.

In FIG. 1, the storage apparatus 100 as one form is configured by a control casing 120 which mainly accommodates a controller (disk array controlling unit) 10 and HDD casings 130, each of which mainly accommodates a plurality of HDDs 30. The HDD casings 130 are disposed on both sides of one control casing 120.

In the control casing 120, a plurality of boards (circuit boards), other power units, and display panels, etc. constituting the later-described controller 10, are connected via an unshown backboard. In a front center of the control casing 120, an administration terminal (SVP) 160 which is in the form of a laptop PC covered by a cover is provided. The administration terminal 160 can be used when the cover is opened. In a lower portion of the administration terminal 160, a plurality of slots for installing, for example, boards etc. configuring channel adapters (hereinafter abbreviated as "CHA") 11 are provided. A board such as the CHA 11 can be detachably provided in each slot. Eight boards of CHAs 11 as one form are installed. A guide rail for inserting and removing the board is provided in each slot, whereby the board is inserted or removed along the guide rail. A connector for electrically connecting the board to the controller 10 is provided at a back of each slot and therefore when a connector section of the board side is connected to the connector, a connected state is attained. The boards may be added, reduced, and/or exchanged by a maintenance worker etc. as occasion demands. Other parts such as a disk adaptor 14 constituting the controller 10 are also installed into the control casing 120 in the same manner. In the HDD casing 130, a number of disk units constituted by HDDs 30 which are formed integrally with a mechanism such as a canister are detachably connected over a multistage.

<Computer System Configuration>

Figure 2:
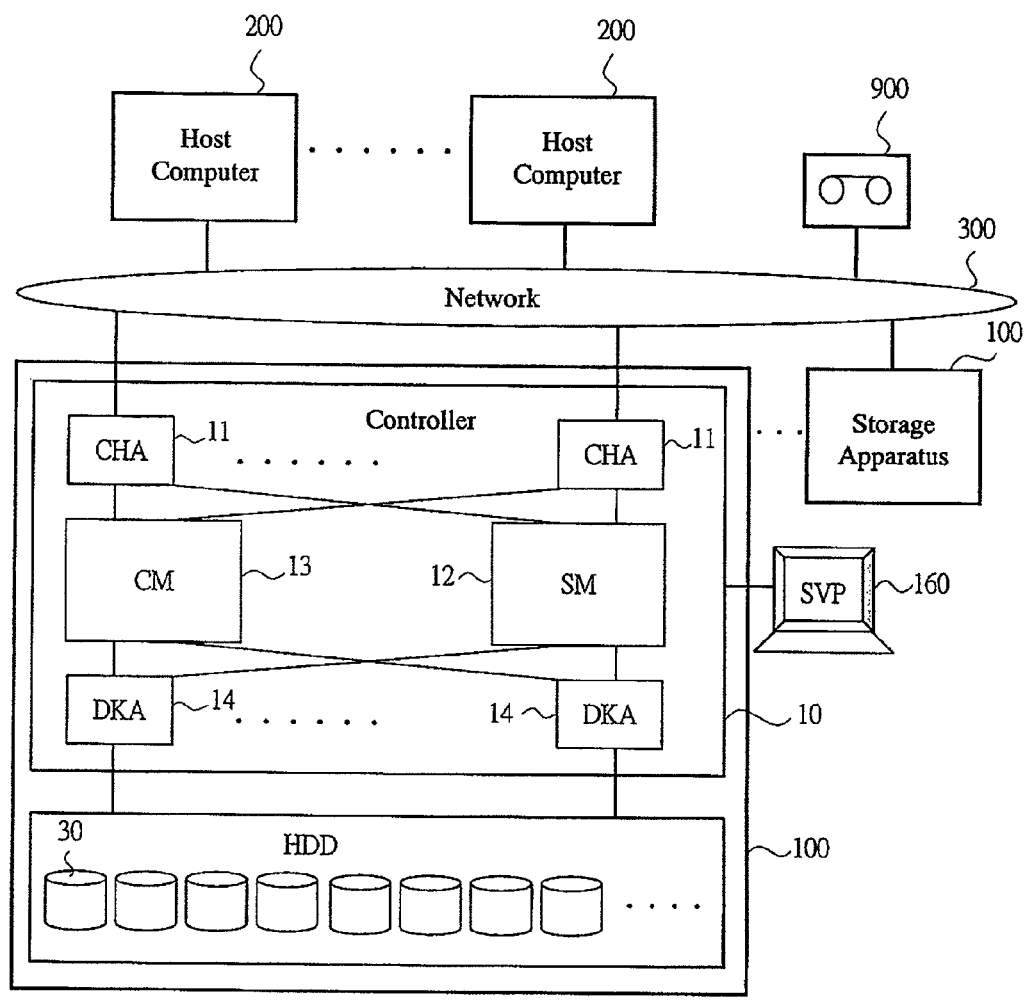
FIG. 2 is a view showing the entire configuration of a computer system including a storage apparatus according to a first embodiment of the present invention.

FIG. 2 shows the entire configuration of a computer system including the storage apparatus 100. The computer system is constituted by connecting one or more storage apparatuses 100, one or more host computers 200, and a magnetic tape unit 900, etc. to a network 300. The network 300 is a network corresponding to a mainframe-based communication protocol, or a network such as a SAN (Storage Area Network) or LAN (Local Area Network), or a network including combination thereof.

The storage apparatus 100 is mainly provided with the controller 10 and the plurality of HDDs 30 connected to the controller, and is connected to the network 300 via the CHAs 11, each of which constitutes a section of the controller 10. Another storage apparatus 100 may also be communicably provided at a site (secondary site) remote from a installation site (primary site) of the storage apparatus 100 by a remote operation. For example, remote copy, and replication, etc. can be executed between the storage apparatuses 100 in order to secure data.

The host 200 is a computer used by a user, and is, for example, a PC, a workstation, or a mainframe computer. The host 200 utilizes various functions provided by the storage apparatus 100 by transmitting a command (request) to the storage apparatus 100. The host 200 and the storage apparatus 100 are communicably connected via the network 300 in accordance with a predetermined communication protocol. When the host 200 is a mainframe-base type in the above connection, the communication between the host 200 and the storage apparatus 100 is established in accordance with a communication protocol such as ESCON (Enterprise System CONnection) (registered trademark) or FICON (FIbre CONnection) (registered trademark). When the host 200 is an open-base type in the above connection, the communication is established in accordance with a communication protocol corresponding to, for example, SAN or LAN. Hereinafter, explanations will be made of the case where the host 200 is particularly a mainframe computer and communicates with the CHAs 11 via the network 300 in accordance with the mainframe-base type communication protocol. In this case, in the access to the device in the storage apparatus 100, the host 200 transmits a data access request in units of blocks, that is, in units of data accesses on the side of the HDD 30, to the CHA 11 in the controller 10.

The controller 10 performs various kinds of control relating to data storage in accordance with the commands received from the host 200 via the CHA 11. For example, the controller receives a read/write command from the host 200, and performs a data input/output process (read/write process) to the device provided on the HDD 30. The controller 10 also receives and transmits, from and to the host 200, various commands for controlling the storage apparatus 100. Also, by setting the disk array (RAID group) on a group of the HDDs 30, the logical device (LDEV) can be set on the RAID group and thereby the control thereof can be performed by a predetermined RAID method.

The plurality of HDDs 30 is connected respectively to the DKAs 14 of the controller 10 by connection lines of, for example, FC-AL types. The storage units to be connected to the controller 10 are not limited to the HDDs 30, and various devices such as flexible disk devices and semiconductor storage devices may be employed as the storage units. The DKAs 14 and the HDDs 30 may be configured to be directly connected to each other or via a network and a switch. Moreover, the HDDs 30 may be configured integrally with the controller 10.

Data is stored in a storage volume provided by one or more HDDs 30, i.e., in a physical storage area provided in a disk or in a storage area logically set on a physical storage area (logical device or logical unit). The storage volumes set on the HDDs 30 include a user data area, which can be accessed from the host 200 and stores user data, and a system area which is used to store system data etc. for the system control such as the control performed by the CHAs 11, and the like. An accessible storage volume may be assigned per a control unit such as the CHA 11. The assignment may be set to have one storage volume common to the plurality of CHAs 11.

The HDD 30 has position information (physical address) for making identification of where data is read or write in the physical storage area of the disk. For example, in the HDD 30, the data can be read and written as random accesses at arbitrary positions of the disk by specifying the position information such as a cylinder and a track. At a time of input/output of data to an actual device, a conversion between an actual device address and a physical address in the disk is made by a process which is performed, for example, in the DKA 14.

<Host Computer>

Figure 3:
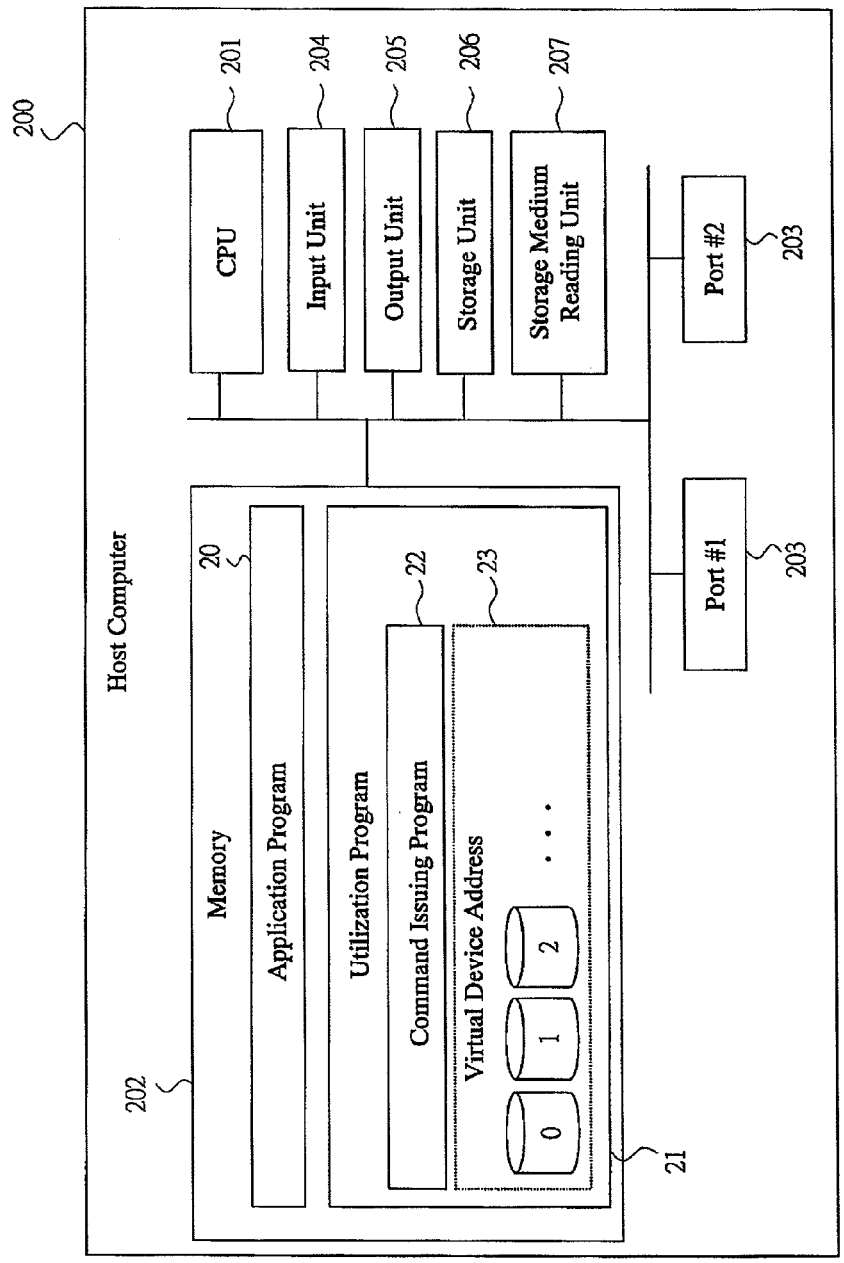
FIG. 3 is a functional block diagram showing, in a computer system including a storage apparatus according to a first embodiment of the present invention, a host computer which is communicably connected to the storage apparatus.

FIG. 3 shows a functional block diagram of the host 200 communicably connected to the storage apparatus 100. The host 200 is a mainframe computer including a CPU 201, a memory 202, ports 203, an input unit 204, an output unit 205, a storage unit 206, and a storage medium reading unit 207. Various functions are realized when the CPU 201 executes programs provided in the memory 202. An application program 20 and a utilization program 21 are provided in the memory 202. A port 203 is a device, which is connected to the network 300 and communicates with external devices such as the storage apparatus 100, other host 200, and the magnetic tape unit 900. The input unit 204 is, for example, a keyboard or mouse for operations performed by a user. The output unit 205 is, for example, a display for displaying information. The storage unit 206 is, for example, an HDD or semiconductor storage device. The storage medium reading unit 207 is a device for reading programs and data stored in a storage medium. The read programs and data are stored in the memory 202 or storage unit 206. The storage medium is, for example, a flexible disk or CD-ROM.

The application program 20 is a program utilizing the functions provided by the storage apparatus 100 to control, for example, online processes. The host 200 provides various information-processing services by executing the application program 20 while appropriately accessing to the data stored in the actual device in the storage apparatus 100. The information-processing service is, for example, an automatic deposit and withdrawal system of a bank.

The utilization program 21 is a program for utilizing various functions provided by the storage apparatus 100, and has a function for issuing, for example, a read/write command for inputting or outputting data to or from the HDDs 30. Particularly, when the host 200 is an administration server which is in charge of maintenance and administration of the storage apparatus 100, the utilization program 21 has various functions for the maintenance and administration similarly to the administration terminal 160.

<Controller>

The controller 10 includes the CHAs (channel adapters) 11, an SM (shared memory) 12, a CM (cache memory) 13, the DKAs (disk adapters) 14, and connection units such as buses and switches for connecting the above members. The respective members are mounted by a board, and are connected to one another by, for example, a switch control board so as to be accessible in high speed. When a plurality of boards are prepared and connected mutually, there are attained a configuration in which the data path to the HDDs 30 is multiplexed. In the present embodiment, each of the CHAs 11 is connected to the SM 12 and the CM 13 by the buses. Also, each of the DKAs 14 is connected to the SM 12 and the CM 13 by the buses. Also, such a configuration that the controller 10 as shown in the Figure is further doubled may be used. Due to the multiplexed configuration, performance improvement and fault tolerance by a parallel process are realized.

The CHA 11 and the DKA 14 are communicably connected mutually via an internal LAN 162, and are also connected to the administration terminal 160. Accordingly, programs to be executed by the CHAs 11 and the DKAs 14 can be transmitted from the administration terminal 160 and installed.

The SM 12 and the CM 13 are memories shared by the CHAs 11 and the DKAs 14. The SM 12 is mainly utilized for storing control information, and commands, etc., and the CM 13 is mainly utilized for storing data (user data). The SM 12 temporarily retains the commands etc. exchanged between the CHAs 11 and the DKAs 14. The CM 13 temporarily retains the data exchanged between the CHAs 11 and the DKAs 14.

The transmission and receipt of data and commands between the sides of the CHA 11 and the DKA 14 are performed via the SM 12, the CM 13, and switches, etc. The communication between the CHA 11 and the DKA 14 is established, for example, as follows. When a command that a certain CHA 11 has received from a certain host 200 is a write command, said CHA 11 writes the write command to the SM 12 and concurrently writes the write data (write object data), which have been received from said host 200, to the CM 13. Meanwhile, the DKA 14 monitors the SM 12 and when detecting that the write command is written into the SM 12, the DKA performs a process for reading out the write data from the CM 13 in accordance with said write command and writing the data to the HDD 30.

Also, when a command that a certain CHA 11 has received from a certain host 200 is a read command, said CHA 11 writes the read command to the SM 12 and concurrently checks whether the read data (read object data) is present in the CM 13. At this time, if the read data is present in the CM 13, the CHA 11 performs a process for transmitting the read data to the host 200. Meanwhile, when the read data is not present in the CM 13, the DKA 14 having detected, by monitoring the SM 12, that the read command is written into the SM 12, reads out the read data from the HDD 30 and writes it to the CM 13, and concurrently writes that effect into the SM 12. Then, when the CHA 11 detects, by monitoring the SM 12, that the read data have been written to the CM 13, the CHA performs a process for transmitting the read data to the host 200.

Note that, from the foregoing description, in addition to such a configuration that the data write and read instructions from the CHA 11 to the DKA 14 are given indirectly by interposing the SM 12, for example, there may be used such a configuration that the above instructions from the CHA 11 to the DKA 14 are directly given without interposing the SM 12. In the above configurations, the SM 12 and the CM 13 are provided independently from the CHA 11 and the DKA 14. However, the above configuration is not limited to this, and there may be also used such a configuration that the SM 12 and the CM 13 may be provided so as to be distributed to the CHA 11 and the DKA 14, respectively. In this case, respective processing units having the distributed memories are mutually connected.

<Administration Terminal>

The administration terminal (SVP) 160 is a computer for maintaining and administering the storage apparatus 100, and includes software for a process for maintaining and administrating the storage apparatus 100. The administration terminal 160 can be configured so as to be built into or externally attached to the storage apparatus 100. Also, the administration terminal 160 may be configured so as to be a computer dedicated to the maintenance and administration of the storage apparatus 100, or to be a PC having a function for the maintenance and administration. Also, the administration terminal 160 may be connected to, for example, a LAN or phone line, and may be configured so as to be a remote console which is remotely connected to the storage apparatus 100. The administration terminal 160 is connected to an external maintenance center or the like via, for example, a LAN. A maintenance worker performs various services of maintenance and administration by operating the administration terminal 160. By operating the administration terminal 160, for example, setting of the physical disk configuration and the logical device of the HDD 30, setting of a logical path, and installation of a program executed by, for example, the CHA 11, and the like can be performed. As the setting of the physical disk configuration, for example, addition or reduction of the HDDs 30 and modification of the RAID configuration can be performed. Further, services for, for example, confirming an operating state of the storage apparatus 100 and specifying failure sites can also be performed. The various settings and control are performed by employing as a user interface the Web page which a Web server operated by the administration terminal 160 provides.

When the administration terminal 160 is configured to be a PC, it is provided with a CPU, a memory, ports, an input unit, an output unit, and a storage unit, etc similarly to the hardware configuration of the host 200. When the CPU executes control programs in the memory, various functions for the maintenance and administration are realized. The control programs and various pieces of information relating to the maintenance and administration are stored in the memory. The port of the administration terminal 160 is connected to the internal LAN 162 so as to be communicable with the CHAs 11, and the DKAs 14, etc. Also, the port may be connected to, for example, a LAN or phone line.

<Magnetic Tape Unit>

The configuration of the magnetic tape unit 900 described in the present embodiment is well known. The magnetic tape unit 900 is a device for inputting and outputting data to or from an area, which is within a magnetic tape, by a sequential access in accordance with an instruction in order to, for example, back up the data. In the magnetic tape unit 900, a magnetic tape is mounted on a deck as occasion demands. The magnetic tape unit 900 sequentially reads and writes the data on the basis of a position of a magnetic head with respect to the magnetic tape which is in a state of being mounted on the deck. The magnetic tape is a medium such as a DAT tape, a cassette tape, an open tape, or a cartridge tape. The magnetic tape unit 900 is communicably connected to the host 200 and the storage apparatus 100 via the network 300. There may be used such a configuration that the magnetic tape unit 900 is directly connected to the host 200 and the storage apparatus 100. By establishing communication between the controller 10 and the host 200 via the network 300, the magnetic tape unit 900 records the backup-data of the data stored in the HDD 30 of the storage apparatus 100, to the magnetic tape. The host 200 has a function for writing the data of the HDD 30 to the magnetic tape unit 900 in order to, for example, backup the data used by the application program (20), or in order to copy the data for transfer etc. to other host 200. Also, the host 200 has a function for reading data from the magnetic tape unit 900 in order to restore the data to the HDD 30 by use of the backup data stored in the magnetic tape unit 900 or copy the data transferred from other host 200 when failure thereof occurs for example. The host 200 and the storage apparatus 100 can transmit data input/output requests (tape access requests) to the magnetic tape unit 900, so that a data input/output process is performed in accordance with the requests at the magnetic tape unit 900. By specifying the address of the magnetic tape unit (identification information) and accessing thereto, the data is inputted or outputted to or from the magnetic tape which is in a state of being mounted on the specified magnetic tape unit 900.

<Configuration for Device Mounting Method>

Figure 4:
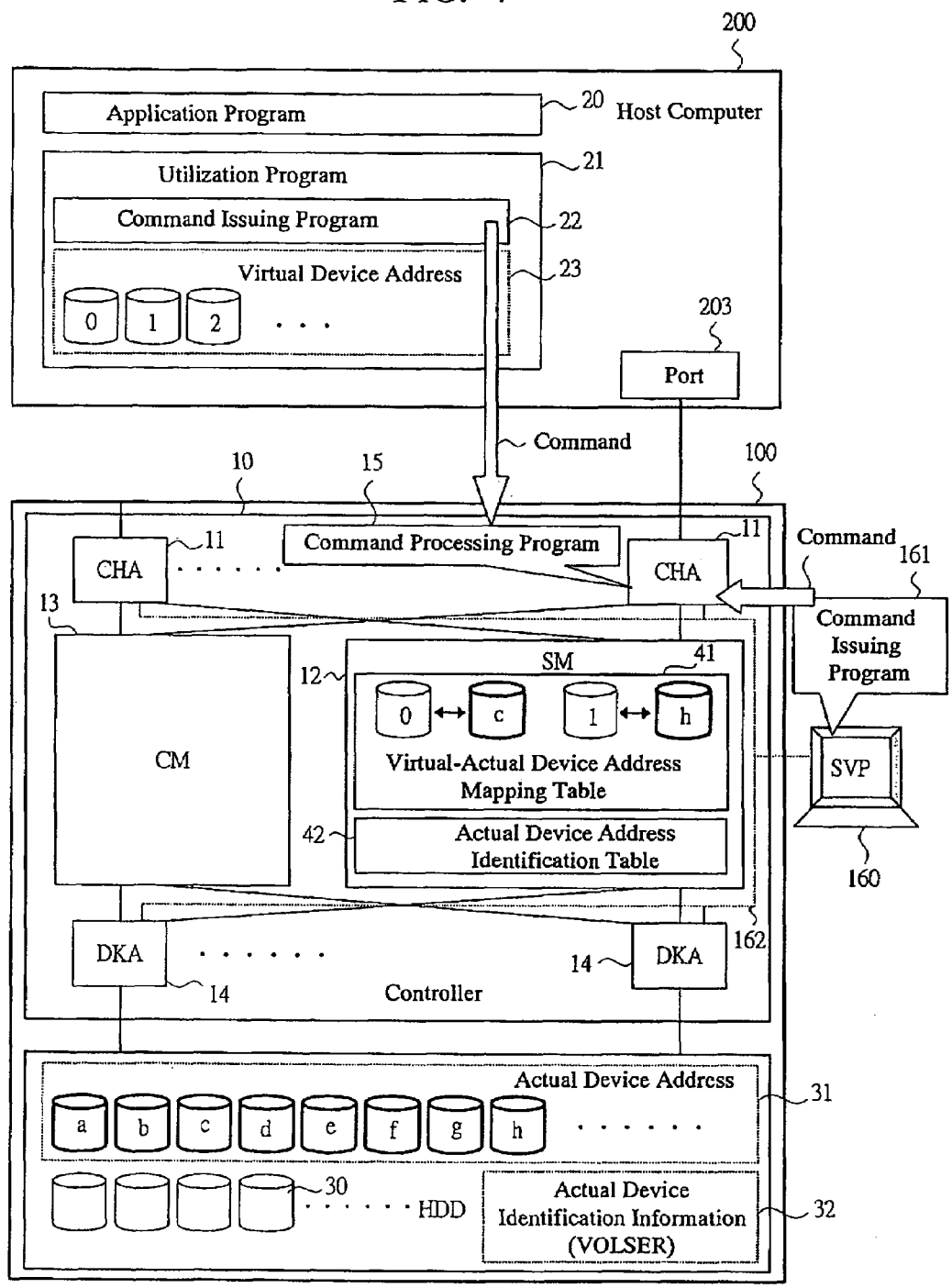
FIG. 4 is a functional block diagram showing, in a computer system including a storage apparatus according to a first embodiment of the present invention, a connection configuration between one host computer and one storage apparatus, and a component pertaining for realizing a characteristic device mounting method of the present invention.

FIG. 4 is a functional block diagram showing a connection configuration between one host 200 and one storage apparatus 100, and components pertaining for realizing a characteristic device mounting method of the present invention. The application program 20 and the utilization program 21 are installed in the host 200. The host is connected to the network 300 via the port 203 so as to be communicable with the CHA 11 of the storage apparatus 100 side.

On the side of the host 200, the utilization program 21 includes a command issuing program 22. The command issuing program 22 is a program for issuing various commands including issuing of the commands that are related to a device mounting to the storage apparatus 100. Also, the utilization program 21 controls virtual device addresses 23 as I/O configuration information. A configuration definition file including the setting of the virtual device addresses 23 is set by the utilization program 21. The configuration definition is the same as the conventionally implemented configuration definition, but is different from it in concepts of configuration definition information. That is, conventionally, the information corresponding to the actual device addresses 31 have been directly controlled in combination with the physical configuration of the storage apparatus side. However, in the present embodiment, the virtual device addresses 23 are controlled instead of controlling the actual device addresses 31.

On a side of the storage apparatus 100, a command processing program 15 is installed in each of the CHAs 11 in the controller 10. The command processing program 15 is a program for performing, in the CHA 11, a process corresponding to the command that have been issued and received from the command issuing program 22 or 161 of the host 200 side or the administration terminal 160. The process corresponding to the command includes a process relating to the device mounting process in addition to the read/write process for the data input/output.

As control information relating to the device mounting method, a virtual-actual device address mapping table 41 and an actual device address identification table 42 are retained in the SM 12 of the controller 10. The tables 41 and 42 will be described later.

On the side of the HDD 30, actual device addresses 31 correspond to the actual devices provided on the sides of the HDDs 30. The actual device address 31 is control information used in the storage apparatus 100. At a time of the access to the actual device on the side of the HDD 30 from the controller 10, the access is performed by specifying the actual device address 31. The actual device addresses 31 themselves are mainly controlled in the control information (the above-described tables 41 and 42) in the SM 12. Each of the device addresses (23 and 31) is control information which is used for hardware-like accesses performed to the device by the host 200 or the storage apparatus 100 in the computer system. For example, on the side of the host 200, {0, 1, 2, . . . } are set and retained as the virtual device addresses 23. On the side of the storage apparatus 100, {a, b, c, . . . } are set and retained as the actual device addresses 31.

The host 200 assigns the actual device identification information 32 to the actual device in a software manner in order to utilize the actual device. The actual device identification information 32 is information such as volume serial numbers (VOLSER) used in, for example, a mainframe-base type. The application program 20 of the host 200 utilizes the actual device identification information 32. A user of the host 200 uses the actual device identification information 32 by appropriately assigning a name, a number, or the like for utilization to the actual device. For example, six or less symbols are arbitrarily assigned as the VOLSER by a user.

There may be used such a configuration that, similarly to the host 200, a command issuing program 161 having the same function in the memory is provided to the administration terminal 160 and the program issues commands, which are related to the device mounting method, to the CHA 11 of the controller 10 via the internal LAN 162. There may be used such a configuration that commands relating to the device mounting are issued from one or both of the host 200 and the administration terminal 160. In the case of such a configuration that said commands is issued from the side of the administration terminal 160, the present device mounting method can be realized without adding other constituent elements to the side of the host 200.

<Actual Device>

Figure 5:
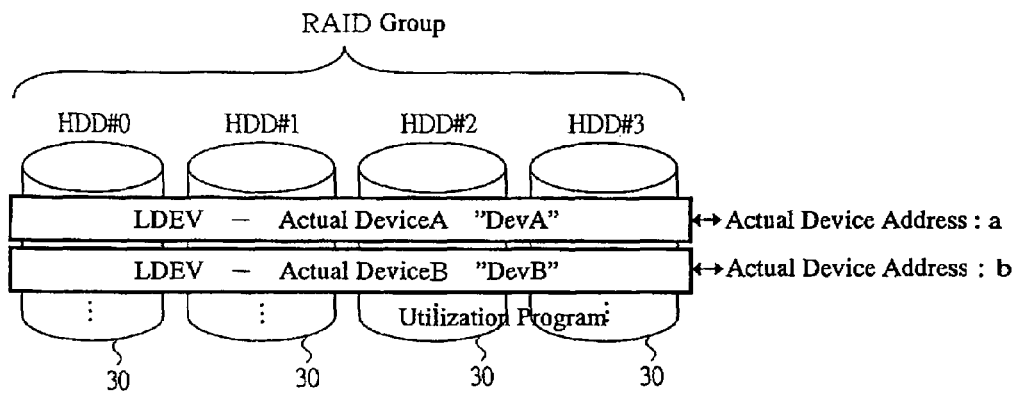
FIG. 5 is an explanatory diagram for showing an example of actual devices controlled in a storage apparatus according to a first embodiment of the present invention.

FIG. 5 is an explanatory diagram for showing an example of the actual devices controlled in the storage apparatus 100. On the side of the storage apparatus 100, for example, a logical device (LDEV) is handled as an actual device. The controller 10 allots a LDEV as an actual device and sets an actual device address 31. The LDEV is a storage volume set on a RAID group consisting of a plurality of HDDs 30, and RAID control in units of LDEV by the controller 10, i.e., control under, for example, a method of the RAID 5 etc. is executed. For example, one RAID group constituted by four HDDs 30 {#0 to #3} is set by the controller 10. Then, a plurality of LDEVs are set on the RAID group across the four HDDs 30. In the LDEV, for example, pieces of striped data are stored in the HDD #0 to HDD #2, and the parity thereof is stored in the HDD #3. In the Figure, the actual device "A" which is one LDEV has the actual device address "a" and the actual device identification information "DevA". The actual device "B" which is another LDEV has the actual device address "b" and the actual device identification information "DevB". When the host 200 is an open-base type, the device is a logical unit (LU) etc. The LU is a logical storage volume viewed from the side of the host 200, and is converted to a physical storage volume on the side of the storage apparatus 100e.

Meanwhile, the virtual device is a device handled in the host 200 in a virtual manner. By the device mounting, the actual device is made to correspond to the virtual device. This relation is due to mapping of the virtual device address 23 and the actual device address 31. The mapping information is controlled by the above-described table 41. As shown in FIG. 4, for example, the actual device address "a" is mapped to the virtual device address "0". Accordingly, when the virtual device address "0" is specified from the side of the host 200 and accessed, the actual device "A" at the actual device address "a" is accessed on the side of the storage apparatus 100.

<Channel Adapter>

The CHA 11 is realized by hardware formed on a board which is integrally formed into a unit, and by software executed by the hardware. Each of the CHAs 11 individually accepts requests from external devices such as the host 200. The identification information (address) is individually allotted to each of the CHAs 11 and when an access is made by specifying the identification information from the external device, a process can be performed in the corresponding CHA 11.

The CHA 11 is connected to the port 203 on the side of the host 200 by a physical link and a logical path provided on the physical link. Also, another CHA 11 can be communicably connected to, for example, another storage apparatus 100 and the magnetic tape unit 900, etc. by different physical links and logical paths. The CHA 11 accepts the above-described block access request from the host 200. Still another CHA 11 accepts a block access request based on a Fiber Channel protocol via a SAN. Further still another CHA 11 accepts a file access request from the host 200. When the CHA 11 receives the access request, the CHA converts it to a data input/output request with respect to the DKA 14 and outputs the converted request. In the case of a write process, write data may be included in the request. When CHAs corresponding to various communication protocols so as to be used as the CHAs 11 are connected mixedly, a storage apparatus connected to different types of networks can be realized.

Figure 6:
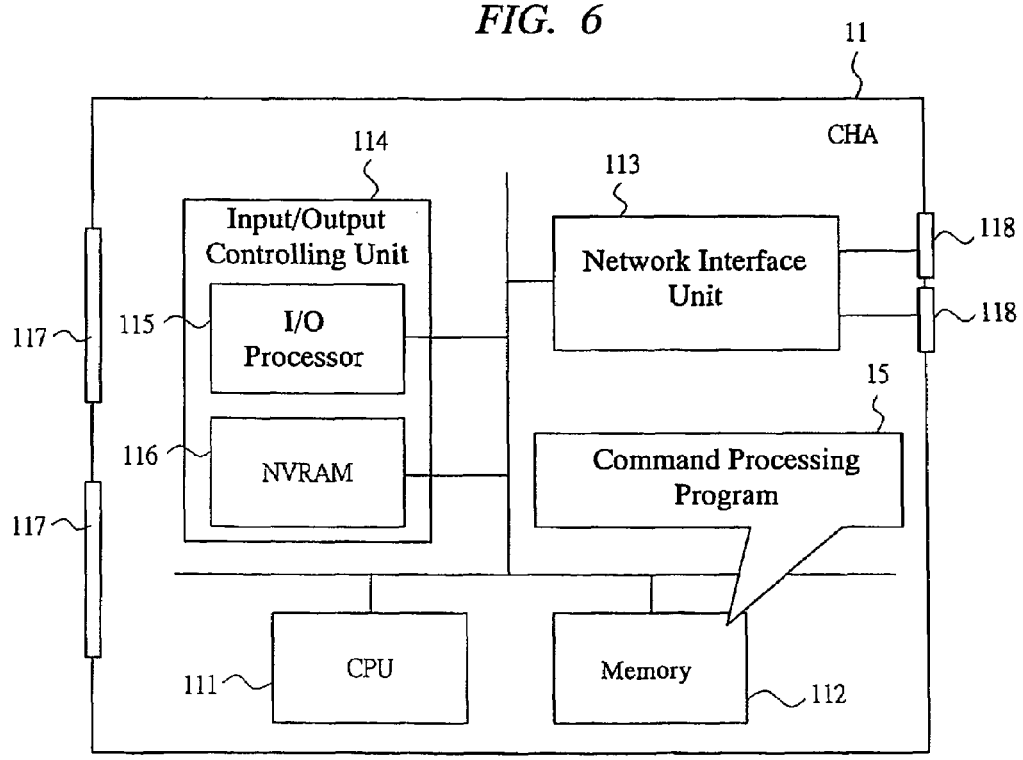
FIG. 6 is a view showing a hardware configuration of a board of a channel adapter in a controller in a storage apparatus according to a first embodiment of the present invention.

FIG. 6 shows a hardware configuration of a board of the CHA 11 in the controller 10. The board of the CHA 11 has a CPU 111, a memory 112, a network interface unit 113, an input/output controlling unit 114, a board-connection connector 117, and a communication connector 118, etc. Note that the DKA 14 also has the hardware configuration same as the CHA 11. The CPU 111 executes control programs by use of the memory 112 so as to control the entire CHA 11. The programs executed in the CHA 11 include a command processing program 15. The command processing program 15 is stored, for example, in the memory 112 and executed by the CPU 111. Alternatively, the program is stored in an NVRAM 116 and executed by an I/O processor 115. The network interface unit 113 is connected to the network 300, and performs interface operations with the external device in accordance with the communication protocol. The input/output controlling unit 114 has the I/O processor 115 and the NVRAM (nonvolatile memory) 116, and executes control for inputting and outputting data and commands among the SM 12, the CM 13, the DKA 14, and the administration terminal 160. The I/O processor 115 is constituted by, for example, a one-chip microcomputer, and controls transmission and receipt of the data and commands so as to relay the communication between the CPU 111 and the DKA 14. The NVRAM 116 stores a program that handles control of the I/O processor 115. The contents of the program which is stored in the NVRAM 116 can be rewritten from, for example, the administration terminal 160. The board connection connector 117 is connected to a connector provided in the backboard of the storage apparatus 100. A communication cable for being connected to the network 300 is connected to the communication connector 118.

<Disk Adapter>

The DKA 14 controls the HDDs 30. For example, said DKA 14 writes write data into a storage area in the HDDs 30 in accordance with a write command which the CHA 11 has received from the host 200. Also, the DKA 14 performs, for example, a process in which a data access request transmitted from the CHA 11 and specified by the logic address is converted to a data access request for the physical disk specified by the physical address. When RAID control is executed on a RAID group, the DKA 14 also executes control such as parallel access in accordance with a RAID method. Also, the DKA 14 can execute control such as the control relating to backup of the data stored in the HDDs 30, and the control for transferring replication of the data of the storage apparatus 100 at the primary site to the storage apparatus 100 at the secondary site.

Note that there may be used such a configuration that an equivalent of the command processing program 15 is provided in the DKA 14, similarly to the CHA 11, to perform a process relating to the device mounting.

<Device Mounting Method>

Figure 7:
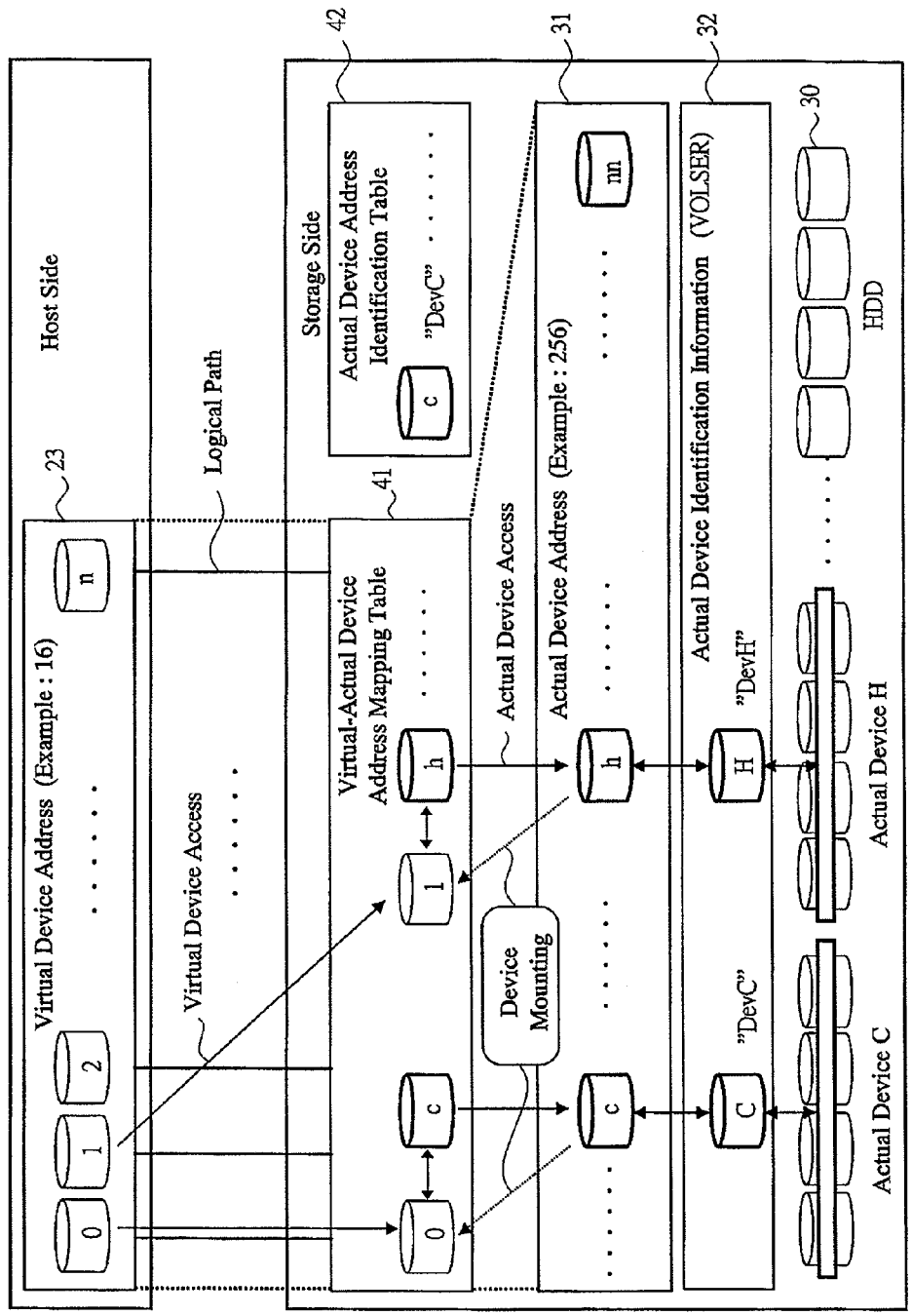
FIG. 7 is an explanatory diagram for showing an outline of a device mounting and an example of the device mounting method in a storage apparatus according to a first embodiment of the present invention.

FIG. 7 is an explanatory diagram for showing the outline of a device mounting method and a device mounting example. On the side of the host 200, there are retained virtual device addresses 23 that are fewer in number than the actual device addresses 31 controlled on the side of the storage apparatus 100. As a simple example, there is shown the case where 16 virtual device addresses 23 are retained on the side of the host 200, and 256 actual device addresses 31 are retained on the side of the storage apparatus 100. The number of the virtual device addresses 23 retained on the side of the host 200 can be arbitrarily set by a user of the host 200 depending on, for example, the utilizing configuration etc. The host 200 can use a plurality of the virtual device addresses 23 at the same time (parallel access to the virtual devices).

On the side of the storage apparatus 100, by the virtual-actual device address mapping table 41, the virtual device address "0" is mapped to the actual device address "c", and the virtual device address "1" is mapped to the actual device address "h", respectively. By the device address identification table 42, the actual device address "c" is associated with the actual device identification information "DevC", and the actual device address "h" is associated with the actual device identification information "DevH", respectively. Setting examples of the tables 41 and 42 are shown in FIGS. 8 and 9. The actual device "C" and the actual device "H" are shown as the actual devices (above-described LDEV) which are specified by the respective actual device addresses 31.

FIG. 8 shows an example of a virtual-actual device address mapping table 41. In the virtual-actual device address mapping table 41, mapping information of the virtual device addresses 23 and the actual device addresses 31 is controlled. For example, the actual device addresses {#c, #h, . . . } that are respectively mapped to the virtual device addresses {#0 to #n} are stored. The virtual device addresses #0 and #1 are in a state in which the actual devices are mounted (mount state), and other virtual device addresses {#2 and the rest} are in a state in which the actual devices are not yet mounted or unmounted (unmounting state).

FIG. 9 shows an example of an actual device address identification table 42. In the actual device address identification table 42, information such as actual device identification information 32 and later-mentioned generation information associated with the actual device address 31 is controlled. For example, the actual device identification information {"DevA'", "DevB", "DevC", . . . } are assigned to the actual device addresses {#a, #b, #c, . . . } by the host 200.

In above FIG. 7, a command is issued from the side of the host 200 to the storage apparatus 100 and the device mounting (mounting of the actual device to the virtual device) is performed on the side of the storage apparatus 100, so that the accesses of the host 200 to the actual device become possible. The access made from the host 200 to the storage apparatus 100 is an access (virtual device access) specifying the virtual device address 23. Meanwhile, in the storage apparatus 100, the access (actual device access) specifying the actual device address 31 is made. The virtual device access from the host 200 to the actual device in the storage apparatus 100 is made via the logical path set on the physical link between the port 203 and the CHA 11. Note that, on the side of the host 200, information other than the virtual device addresses 23 is not particularly required to be retained as the I/O configuration information. For example, if the application program 20 in the host 200 recognizes the actual device identification information 32 of the actual device to be a utilization object, accesses to the actual device can be made by using the actual device identification information 32 and the virtual device addresses 23 retained as the I/O configuration information. As a matter of course, information other than the virtual device address 23 may be retained as the I/O configuration information on the side of the host 200.

A standard procedure for utilizing the actual device from the host 200 is, for example, as follows. (1) First, the information representing a state of the device mounting is displayed and confirmed on the side of the host 200. (2) A request for mounting the actual device to the virtual device is issued to the storage apparatus on the side of the host 200. (3) A process for mounting the actual device to the specified virtual device is performed in the storage apparatus. (4) The data input/output access is made from the side of the host 200 to the virtual device that has been in a mounting state. (5) A request for unmounting the actual device that has been utilized, from the virtual device that is in the mounting state, is issued from the side of the host 200. (6) In the storage apparatus 100, a process for unmounting the actual device to the specified virtual device is performed. The above-described procedure can be partly omitted. Confirmation of the mounting information may be made as occasion demands. When the actual devices that are in the mounting states are continuously utilized, the data input/output accesses may be continuously made while remaining the mounting state. If a certain virtual device is changed for being used as another actual device, the mounted actual device is unmounted and another actual device is mounted.

The actual device identification information 32 of the actual device address identification table 42 is constructed and written, for example, in the following cases. (1): A process for writing the actual device identification information 32 is performed from the host 200 to the storage apparatus 100. For example, a request for the above-described write is issued, from the host 200 to the storage apparatus 100, by specifying the actual device address 31 and the actual device identification information 32. Then, in accordance with the above-mentioned request, the CHA 11 of the storage apparatus 100 performs a process for writing the actual device identification information 32 corresponding to the specified actual device address 31, to the actual device address identification table 42 in the SM 12. Alternatively, in accordance with said request, the CHA 11 performs a process for writing the actual device identification information 32 corresponding to the above specified actual device address 31, to the above-described table 42 and concurrently to a fixed area provided in the HDD 30 via the DKA 14. If said actual device identification information 32 is to be written to the side of the HDD 30, a load thereof is heavier than the case of the write only into the side of the SM 12 because the disk accesses are made. However, instead of this, the actual device identification information 32 can be reconstructed by utilizing the information written on the side of the HDD 30 when the information on the side of the SM 12 has volatilized. Alternatively, there may be performed such a process that, in order to write the actual device identification information 32 from the host 200 to the storage apparatus 100, the mounting request in which the virtual device address 23, the actual device address 31, and the actual device identification information 32 are specified is made, and the CHA 11 maps the actual device address 31 to the above specified virtual device address 23 in the table 41 in accordance with the mounting request and concurrently writes, into the table 42, information corresponding to the above specified actual device identification information 32. (2): In constructing the tables 41 and 42 in the SM 12 at a time of turning on power on the side of the storage apparatus 100 for example, the controller 10 reads the actual device identification information 32 from the HDD 30 and reflects it to the table 42.

<Processes in Host Computer>

The command issuing program 22 on the side of the host 200 performs a process for issuing commands (requests) relating to data input/output performed with respect to the actual device of the storage apparatus 100 on the basis of the operations made by a user. The command issued by the process of the command issuing program 22 is transmitted to the network 300 via the port 203, and received by the CHA 11 of the controller 10. The CHA 11 performs a process corresponding to the received command by executing the command processing program 15. A mounting request, an unmounting request, and display of the mounting information can be similarly executed also on the side of the administration terminal 160.

The command issuing program 22 performs processes (a mounting-request-command issuing process, an unmounting-request-command issuing process, a mounting-information-displaying-command issuing process, and various command issuing processes for data input/output) for issuing respective commands for making, for example, a mounting request, an unmounting request, a mounting information display request, and various requests for data input/output performed with respect to the device.

The mounting-request-command issuing process is a process for issuing a request (mounting request command) for making the storage apparatus 100 perform a process for mounting the actual device to the specified virtual device (mounting process). In the present process, the side of the host 200 gives, to the individual virtual device address 23 controlled as the I/O configuration information, an instruction to specify which actual device addresses 31 on the side of the storage apparatus 100 are mapped. In the mounting request command, the virtual device address 23 and the actual device identification information 32 are specified.

The unmounting-request-command issuing process is a process for issuing a request (unmounting request command) in which the storage apparatus 100 is made to perform a process for unmounting the actual device from a specified virtual device (unmounting process). In the present process, there is given an instruction to nullify the mounting state of the virtual device and/or actual device, i.e., an instruction to nullify the mapping information of the virtual and/or actual device addresses.

The mounting-information-displaying-command issuing process is a process for issuing a request (mounting-information displaying command) in which the storage apparatus 100 is made to perform a process (mounting-information displaying process) for displaying the information relating to the mounting state of the virtual devices and the actual devices (mounting information) on the side of the host 200. In the present process, the mounting information is read out from the tables (41 and 42) which are in the SM 12 of the controller 10, and is transmitted to the side of the host 200. Then, on the side of the host 200, the received mounting information is displayed at the output unit 205 in predetermined form. Consequently, the relation between, for example, the virtual device addresses 23, the actual device addresses 31, and the actual device address identification information 32 is presented to the user of the host 200. The above-described mounting information is a part or the entirety of the virtual-actual device address mapping information which is mainly read out from the table 41. Also, even in the case of acquiring, on the side of the host 200, mounting information other than the displayed mounting information, the present process may be utilized. The host side is not required to always retain the mounting information, and the mounting information may be obtained by the present process in case of necessity.

The various command issuing processes for data input/output are processes for issuing commands for performing, for example, read/write of data with respect to the actual device. This is the same as the conventionally performed process, but is different from it in a concept of definition information. That is, the command is issued from the side of the host 200 by specifying the virtual device address 23.

<Process in Channel Adapter>

The CHA 11 performs, by the command processing program 15, command processes corresponding to the various commands received from the host 200 or administration terminal 160, etc. Corresponding to each of the above-described commands, the command processing program 15 performs a mounting-request-command process, an unmounting-request-command process, a mounting-information-displaying-command process, and a command process for data input/output, etc.

In the mounting-request-command process, so as to correspond to the above-described mounting request command, searches are made for actual devices associated with both of the virtual device to which the mounting request command is issued and the actual device identification information 32 which is specified by the mounting request command, and then mapping of the virtual device address 23 and the actual device address 31 is performed, and the mapping information is stored in a corresponding position in the virtual-actual device address mapping table 41 of the SM 12.

In the unmounting-request-command process, so as to correspond to the above-described unmounting request command, regarding the virtual device (or actual device) to which the unmounting request command is issued, the already set corresponding virtual-actual device address mapping information is nullified in the virtual-actual device address mapping table 41 in the SM 12.

In the mounting-information-displaying-command process, a part or the entirety of the information controlled and retained in the tables 41 and 42 in the SM 12 is read out as the mounting information and transmitted to the side of the host 200. On the side of the host 200, the mounting information having been transmitted from the side of the storage apparatus 100 is displayed in predetermined form.

In the various command processes for data input/output, regarding each of various commands such as read/write commands issued by specifying the virtual device address 23, the actual device address 31 is obtained from the virtual device address 23 in accordance with the corresponding mapping information of the virtual-actual device address mapping table 41 in the SM 12, and then a process to the actual device on the side of the HDD 30 is performed by the obtained actual device address 31.

<Entire Flow>

Figure 10:
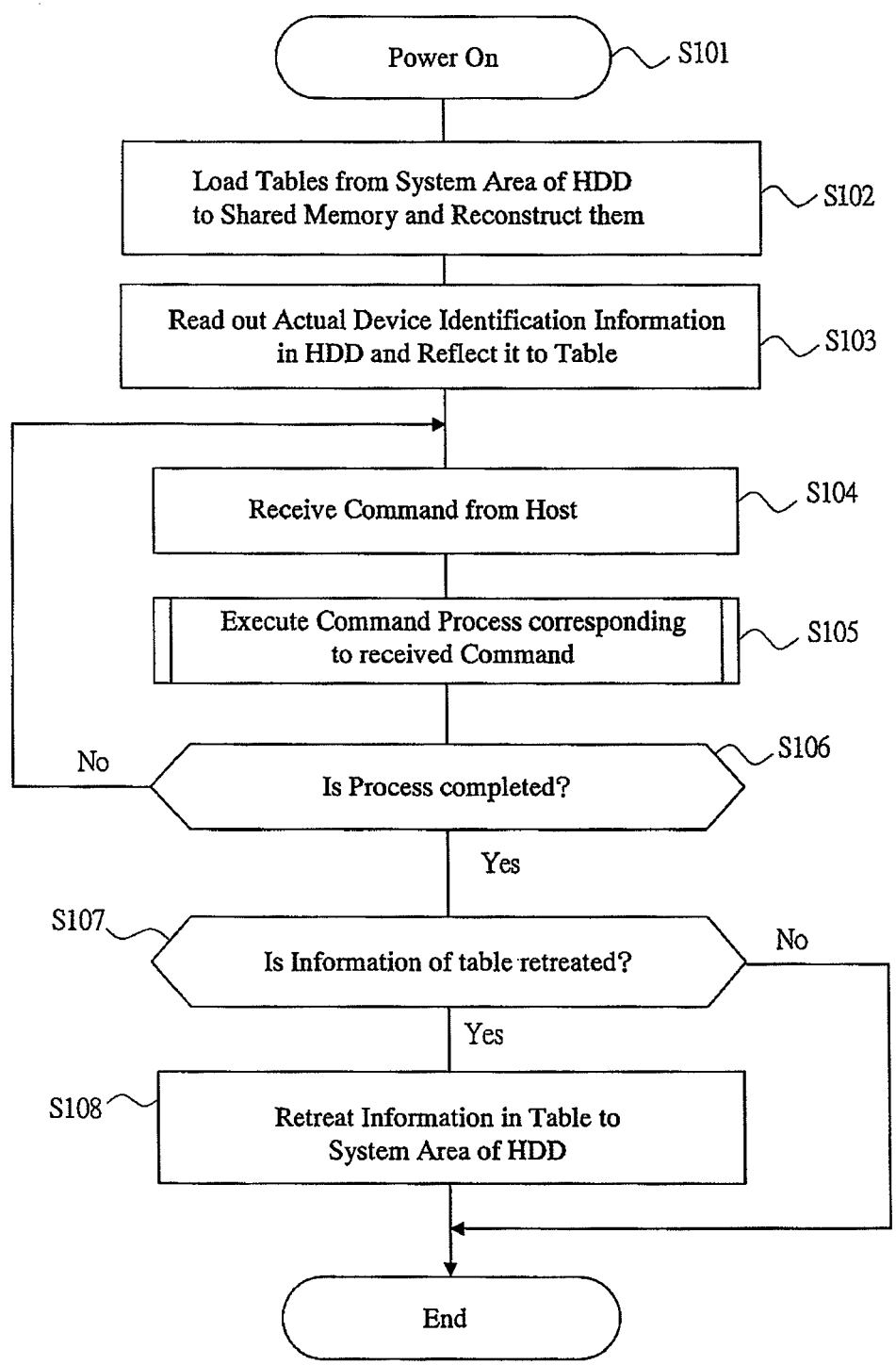
FIG. 10 is a flow chart showing the entire process pertaining to a device mounting method which is performed from power-on to completion of the process in a storage apparatus according to a first embodiment of the present invention.

FIG. 10 is a flow chart showing the entire process pertaining to a device mounting method which is performed from power-on to completion of the process in a storage apparatus 100. The respective tables 41 and 42 are retained in the SM 12 while the storage apparatus 100 is active. In order to prevent volatilization of the SM 12 and losing of the data of the tables 41 and 42, the storage apparatus 100 performs, at an appropriate timing, a process in which the information of the tables 41 and 42 in the SM 12 is retreated (saved), for example, in a free space of a system area or the like in the HDD 30, or in a storage area on the side of the administration terminal 160. At a time of power-on etc. of the storage apparatus 100 after the volatilization, the retreated information of the tables 41 and 42 is read out and a process for reconstructing it in the SM 12 is performed.

In FIG. 10, first, when power of the storage apparatus 100 is turned on (S101), the controller 10 in a start mode reads out the information of the tables 41 and 42 from the system area of the HDD 30, loads the information into the SM 12, and reconstructs the tables 41 and 42 (S102). When the actual device identification information 32 in the read-out actual device address identification table 42 has not yet been determined, the controller 10 reads out the actual device identification information 32, which is stored in a fixed position in the HDD 30, and reflects the information to the above-described table 42 (S103).

After the above-described tables 41 and 42 are constructed, the storage apparatus 100 shifts commands from the side of the host 200 to acceptable states (normal mode). The CHA 11 receives the commands from the external device such as the host 200 (S104). The CHA 11 executes a command process, which corresponds to the received commands, by the command processing program 15 (S105). When one command process is completed, whether another received command is present is confirmed and if another received command is present, a corresponding command process is repeated similarly thereto (S106).

After the process is completed, the controller 10 judges whether the information of the tables 41 and 42 in the SM 12 has to be retreated in the system area of the HDD 30 (S107) and performs, as occasion demands, a process for retreating the information of the tables 41 and 42, which are in the SM 12, into the system area of the HDD 30 (S108). For example, the information of the above-described tables 41 and 42 is retreated at a timing, e.g., at a time of shifting it to a standby mode due to power-off of the device, at a time when updating of the information of the tables 41 and 42 occurs due to, for example, a mounting process, or when a predetermined period of time has elapsed.

Figure 11:
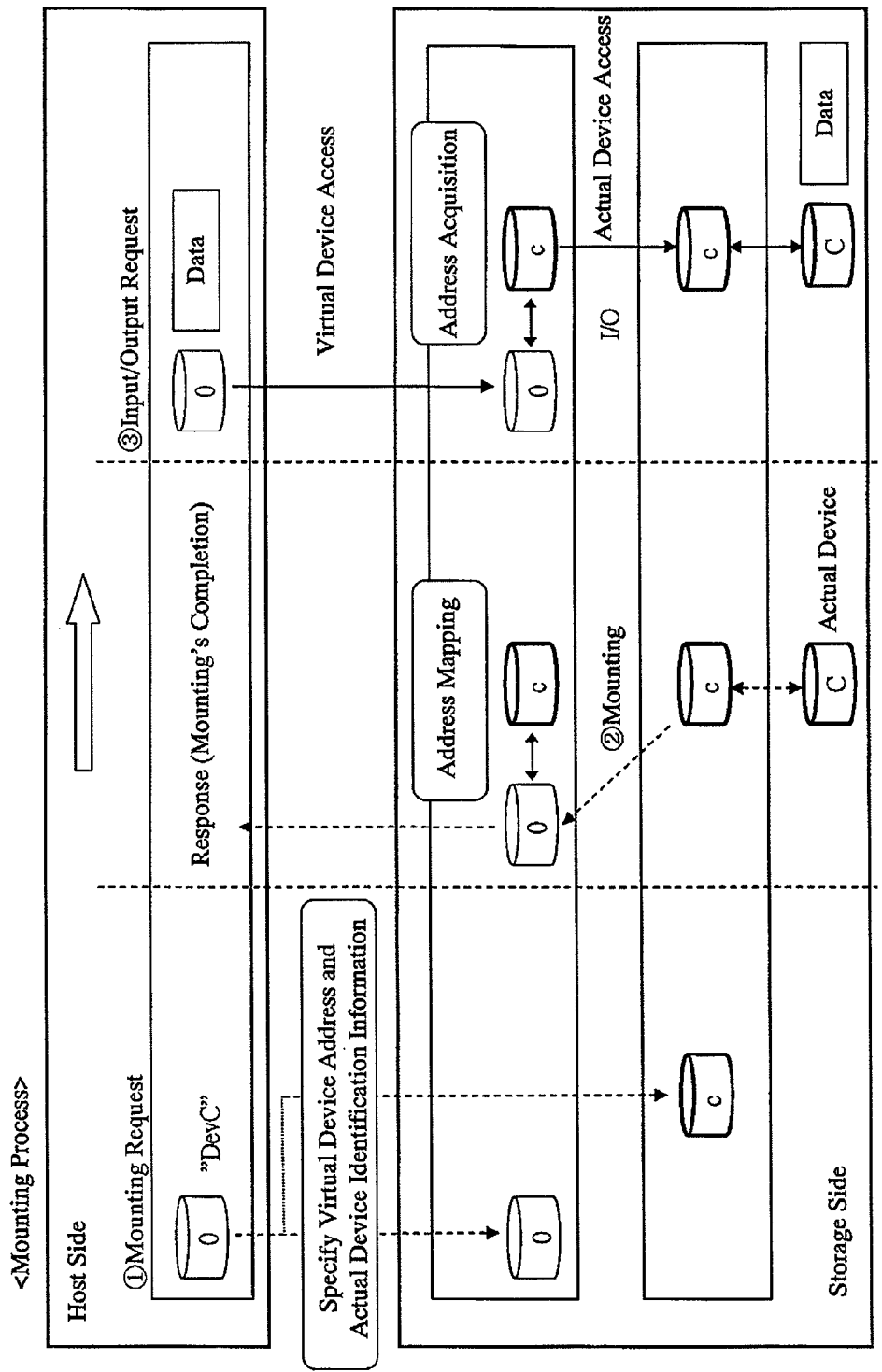
FIG. 11 is an explanatory diagram for showing a mounting process corresponding to a mounting request command in a storage apparatus according to a first embodiment of the present invention.
Figure 12:
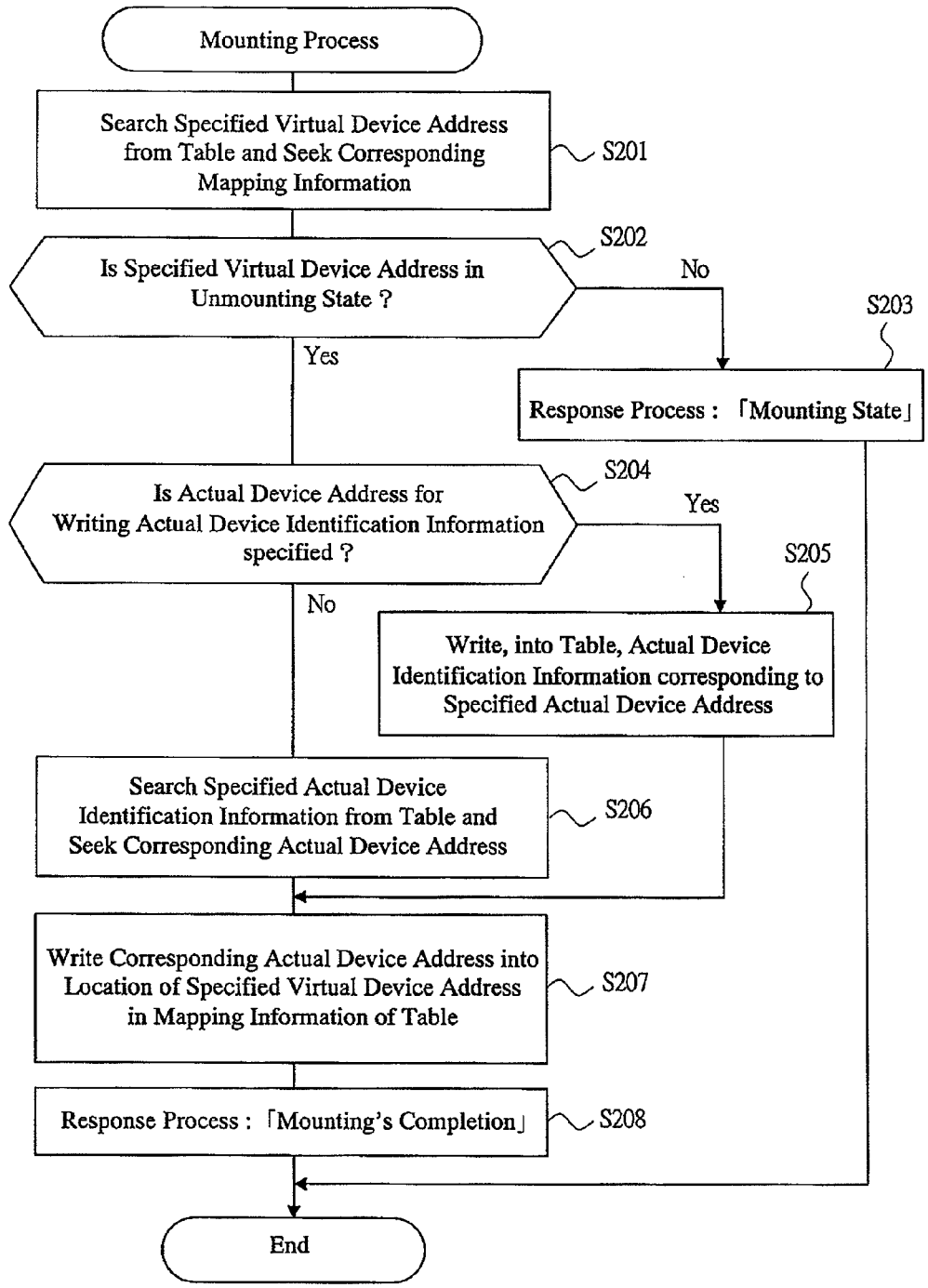
FIG. 12 is a flow chart showing a mounting process corresponding to a mounting request command in a storage apparatus according to a first embodiment of the present invention.
Figure 13:
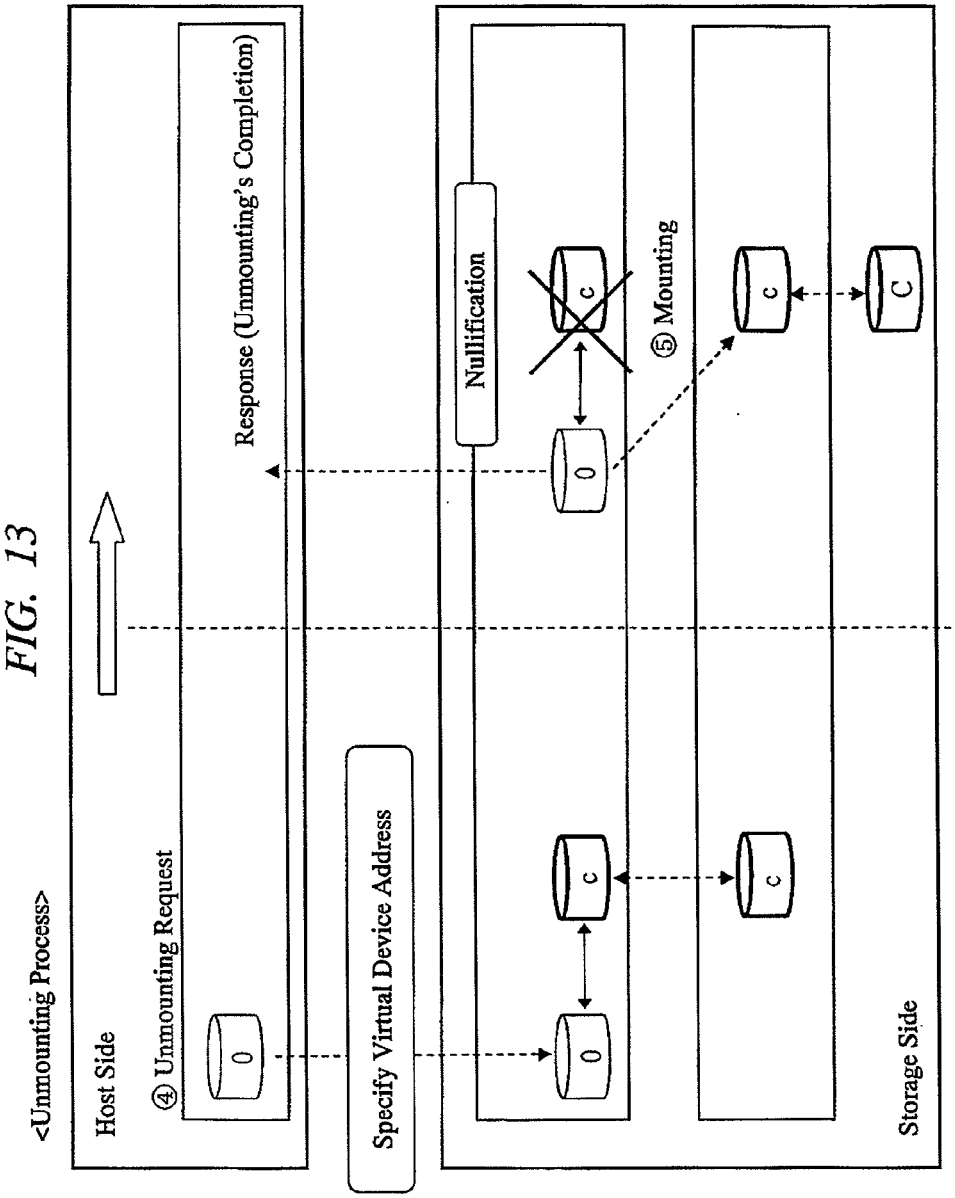
FIG. 13 is an explanatory diagram for showing an unmounting process corresponding to an unmounting request command in a storage apparatus according to a first embodiment of the present invention.
Figure 14:
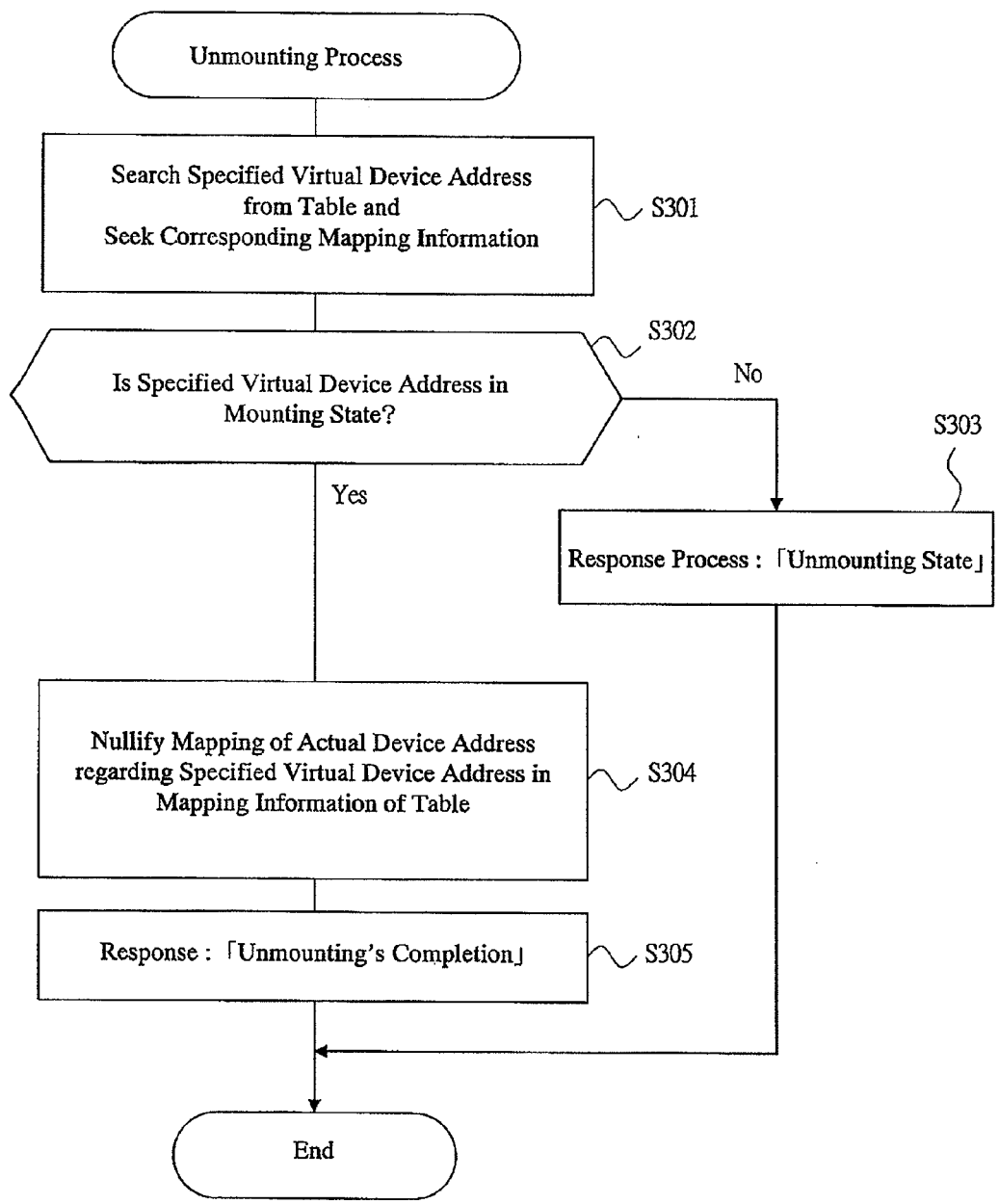
FIG. 14 is a flow chart showing an unmounting process corresponding to an unmounting request command in a storage apparatus according to a first embodiment of the present invention.
Figure 15:
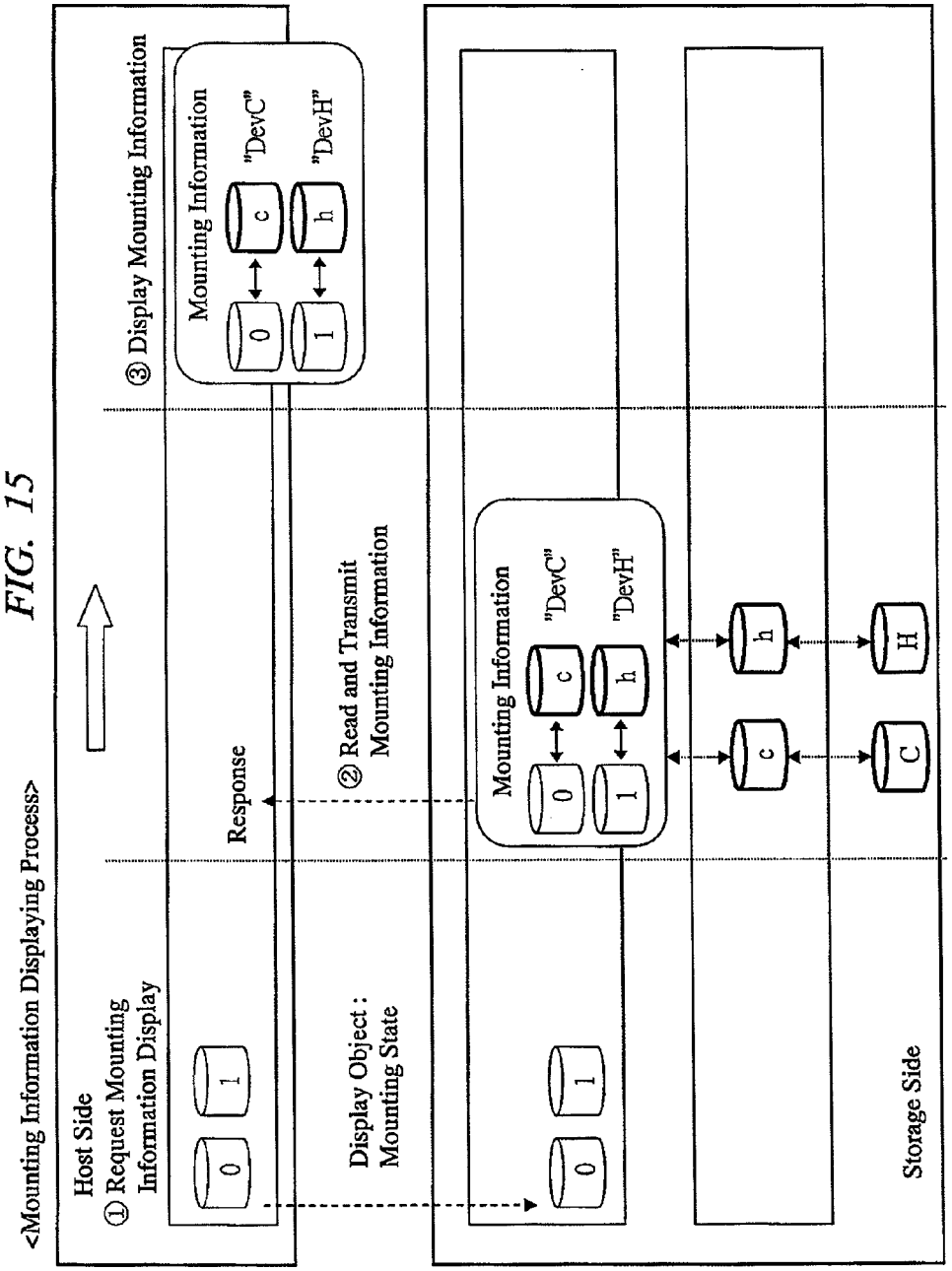
FIG. 15 is an explanatory diagram for showing a mounting information displaying process corresponding to a mounting information displaying command in a storage apparatus according to a first embodiment of the present invention.
Figure 16:
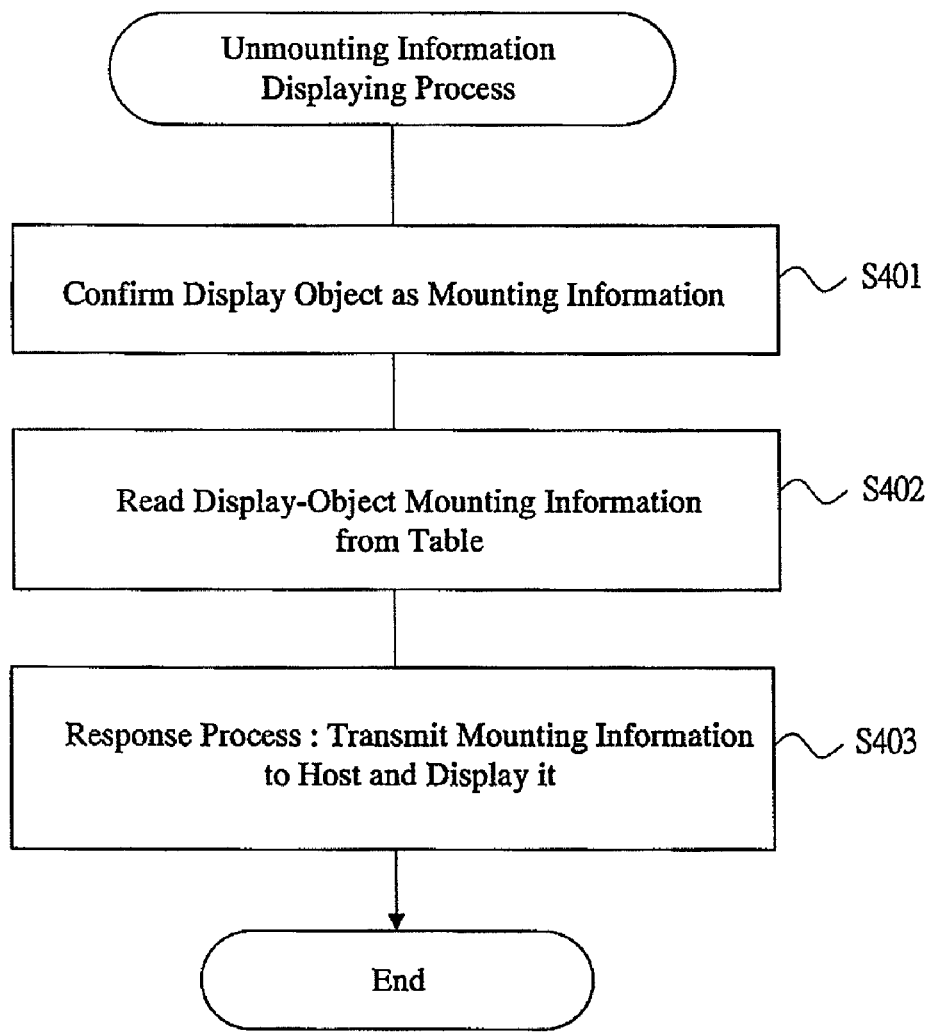
FIG. 16 is a flow chart showing a mounting information displaying process corresponding to a mounting information displaying command in a storage apparatus according to a first embodiment of the present invention.

Next, a process corresponding to each command of the device mounting method will be explained. FIG. 11 is an explanatory diagram of a mounting process corresponding to a mounting request command, and FIG. 12 is a flow chart of the process thereof. FIG. 13 is an explanatory diagram of an unmounting process corresponding to an unmounting request command, and FIG. 14 is a flow chart of the process thereof. FIG. 15 is an explanatory diagram of a mounting information displaying process corresponding to a mounting information displaying command, and FIG. 16 is a flow chart of the process thereof. Note that the read/write process to the device which is in a mounting state is the same as the conventional one except for the relation between the virtual and actual device addresses (address acquisition).

<Mounting Process>

In FIGS. 11 and 12 relating to a mounting process, first, a mounting request command is issued from the host 200 or administration terminal 160. The specification of the virtual device address 23 and that of the actual device identification information 32 are included in the present command. For example, the request is made for mounting, to the virtual device address "0", the actual device in which the actual device identification information becomes "DevC".

When the storage apparatus 100 receives the above-described command, it performs a mounting process as shown in FIG. 12 by the command processing program 15 of the CHA 11. The CHA 11 refers to, for example, the contents of the received command and the tables 41 and 42 in the SM 12, etc. and judges whether the mounting is possible or impossible. Regarding the virtual device address 23 which has been specified on the side of the host 200, the CHA 11 searches the virtual device address 23 in the virtual-actual device address mapping table 41, and refers to the corresponding mapping information (S201). Then, the CHA makes confirmation of whether the specified virtual device address 23 in the mapping information is in an unmounting state (S202). When the actual device address 31 has already been mapped to the specified virtual device address 23 (S202-No), there is performed a response process in which error information indicating to the specified virtual device that the actual device has already been in a mounting state is transmitted to the side of the host 200 (S203). When the specified virtual device address is in an unmounting state (S202-Yes), the mounting to the actual device becomes possible.

Also, when the actual device address 23 for writing the above-described actual device identification information 32 from the side of the host 100 is directly specified (S204-Yes), the CHA 11 performs, to the actual device address identification table 42, a process for writing the specified actual device identification information 32 into a location corresponding to the specified actual device address 31 (S205).

According to the actual device identification information 32 to which the mounting request instruction is given, the CHA 11 searches the actual device identification information 32 in the actual device address identification table 42, and seeks the actual device address 31 corresponding to the specified actual device identification information 32 (S206). Then, by the virtual-actual device address mapping table 41, the sought actual device address 31 is stored in a location corresponding to the virtual device address 23 to which the mounting request instruction has been issued (S207). Consequently, a mounting state in which the actual device is mounted to the specified virtual device is attained. The CHA 11 performs a response process for transmitting, to the side of the host 200, the information indicating that the device mounting has been normally completed (S208). For example, on the side of the storage apparatus 100 of FIG. 11, the actual device address "c" is obtained according to the specified actual device identification information "DevC" and it is mapped to the virtual device address "0".

After the above-described mounting process is completed, the host 200 makes a request for data input/output to the virtual device which is in a mount state. For example, the host 200 transmits write commands and write data to the above-described virtual device address "0" in order to write data into the virtual device. This is a virtual device access specifying the virtual device address 23. In the storage apparatus 100, based on the above-described request, the actual device address "c" which corresponds to the specified virtual device address "0" is obtained by referring to the table 41 in the SM 12. Then, according to the obtained actual device address "c", there is performed the actual device access for inputting/outputting the data with respect to the actual device "C" on the side of the HDD 30. The CHA 11 stores the input/output command in the SM 12, and stores the write data in the CM 13. The DKA 14 reads out the input/output command from the SM 12, reads out the write data from the CM 13, and executes the data input/output to the actual device "C". Then, a response to the data input/output is made from the DKA 14 to the side of the CHA 11, and a response to the command is made from the CHA 11 to the side of the host 200.

<Unmounting Process>

In FIGS. 13 and 14 regarding an unmounting process, first, an unmounting request command is issued from the host 200 or administration terminal 160. The present command includes the specification of the virtual device address 23. For example, it is a request for unmounting the actual device, which is in a mounting state, to the virtual device having the virtual device address "0".

When the storage apparatus 100 receives the above-described command, the storage apparatus performs an unmounting process shown in FIG. 14 by the command processing program 15 of the CHA 11. The CHA 11 refers to, for example, the contents of the received command, the tables 41 and 42 in the SM 12, and the like, and judges whether the unmounting are possible or impossible. Regarding the virtual device address 23 having been specified on the side of the host 200, the CHA 11 searches the virtual device address 23 in the virtual-actual device address mapping table 41, and refers to the corresponding mapping information (S301). Then, the CHA makes confirmation of whether the specified virtual device address 23 in the mapping information is in a mounting state (S302). When no actual device address 31 is mapped to the specified virtual device address 23 (S302-No), there is performed a response process for transmitting, to the side of the host 200, error information indicating to the specified virtual device that any actual device is in an unmounting state (S303). When the specified virtual device address is in a mounting state (S302-Yes), the unmounting of the actual device is possible.

In the corresponding mapping information of the virtual-actual device address mapping table 41, the CHA 11 nullifies the mapping of the actual device address 31 corresponding to the virtual device address 23 to which the unmounting request instruction has been issued (S304). The nullifying of the mapping is to reset and the like values of the actual device address 31 written in the table 41. Consequently, an unmounting state in which the actual device is unmounted from the specified virtual device is attained. The CHA 11 performs a response process for transmitting, to the side of the host 200, the information indicating that the unmounting of the device has been normally completed (S305). For example, on the side of the storage apparatus 100 in FIG. 13, the mapping of the actual device address "c" to the specified virtual device address "0" is nullified, and the actual device "C" is unmounted.

<Mounting-Information Displaying Process>

In FIGS. 15 and 16 regarding a mounting-information displaying process, first, a mounting-information displaying command is issued from the host 200 or administration terminal 160. The object to be displayed (obtained) as mounting information can be specified by the command. For example, as the display object, there is given an instruction to request the mounting information of all the virtual device addresses 23 handled on the side of the host 200 or of the virtual device addresses 23 in the specified area. Alternatively, for example, as the display object, the mounting information of all the virtual device addresses 23 in mounting or unmounting states is requested. Alternatively, for example, the mounting information of the particular virtual device addresses 23 or actual device identification information 32 is requested. In the Figure, there is shown the case in which the mounting information of all the virtual devices in mounting states is employed as the display object.

When receiving the above-described command, the storage apparatus 100 performs the mounting-information displaying process shown in FIG. 16 by the command processing program 15 of the CHA 11. The CHA 11 refers to the contents of the received command, and confirms the display object to be displayed as the mounting information (S401). Then, the mounting information to be a display object is read out from the tables 41 and 42 in the SM 12 (S402). When the display object is all of the table contents, all pieces of information of the tables 41 and 42 are directly read out as it stands. When the display object is a part of the table contents, the information is searched and read out from the tables 41 and 42 in accordance with the specified information. Then, the CHA 11 performs a response process in which the read mounting information is transmitted to the side of the host 200 and displayed thereat (S403). Note that if the mounting information corresponding to the specified display object is not present, error information of that effect is transmitted. For example, on the side of the storage apparatus 100 in FIG. 15, so as to correspond to two actual devices "C" and "H" in the mounting states, {0, c, "DevC"} and {1, h, "DevH"} are read out as the mounting information.

<Security and Protection>

Security and protection of the virtual device are realized by a LDEV security function and a LDEV guard function, which are set to the actual devices (above-described LDEV) corresponding to the actual device addresses 31. At a time of the device mounting, that is, when the actual device address 31 is mapped to the virtual device address 23, device attributes depending on the above-described functions are inherited. Accordingly, the security and protection of the virtual device are fulfilled similarly to the actual device. The above-described LDEV security function is well known and has a function of setting access authority for the LDEV with respect to each of the respective hosts 200 and users who use the hosts 200. According to the relevant function, permission and control of accesses to the data of the actual device to be an object are performed per each of the hosts 200 and the users. The above-described LDEV guard function is well known and has a function of setting access authority (permitting only read or permitting read and write or the like) for the LDEV on the side of the storage apparatus 100.

In the foregoing description, the device mounting in the connection between one host 200 and one storage apparatus 100 has been described. However, the device mounting can also be performed similarly to that in each connection between a plurality of hosts 200 and a plurality of storage apparatuses 100. That is, so as to correspond to the access from the plurality of hosts 200, the storage apparatus 100 controls the mapping information etc. of each of the hosts 200. So as to correspond to the accesses to the plurality of storage apparatuses 100, the host 200 controls the virtual device addresses 23 corresponding to the respective storage apparatuses 100.

As described above, the present embodiment adopts a method in which the host 200 makes the data access by mounting, to the virtual device, the actual device requiring the access as occasion demands. Therefore, it is necessary for the side of the host 200 to have the pieces of I/O configuration information (virtual device addresses) fewer in number than the side of the storage apparatus 100, and, by appropriately performing the mounting, the accesses to all the actual devices can be made. In the conventional configuration, for example, when 256 devices are controlled on the storage apparatus side, 256 device addresses are retained on the host side so as to correspond one-on-one thereto. However, in the present embodiment, even when 256 actual devices are provided or when a number of the actual devices by thousands or ten thousands are further added onto the side of the storage apparatus 100, the side of the host 200 is not required to retain the same number as that of the device addresses. Also, the side of the host 200 is not required to retain the I/O configuration information of the actual devices which are not required to be always accessible from the side of the host 200. Therefore, the control of the I/O configuration information on the side of the host 200 is not complicated and the used resources can be saved.

Second Embodiment

<Generation Management>

Figure 17:
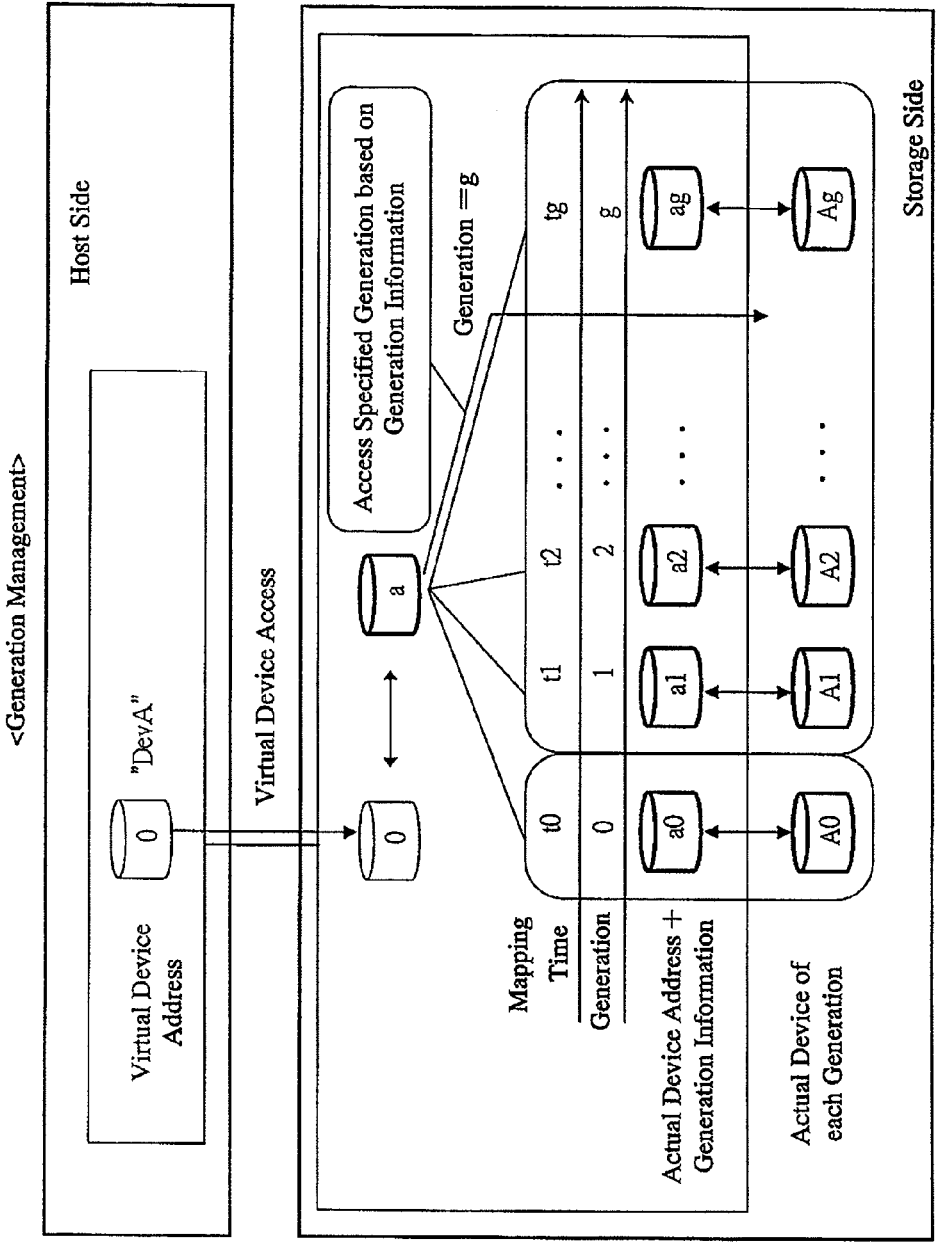
FIG. 17 is an explanatory diagram for showing a device mounting method in a storage apparatus according to a second embodiment of the present invention.

Next, in addition to the configuration of the first embodiment, a storage apparatus according to a second embodiment of the present invention executes generation management of a virtual device to be an object. The hardware configuration thereof is the same as that of the first embodiment. FIG. 17 is an explanatory diagram of a device mounting method employed in a storage apparatus of a second embodiment. The generation management performs, on the side of the storage apparatus 100, a process for saving and controlling a data-state change due to temporal elapse of the same virtual data so as to be handled as data of the actual device of each generation, whereby the data of each generation, which are different in the access to the same virtual device address 23 from the side of the host 200, becomes available. An opportunity of saving the generation includes, for example, a periodical timing, a timing at which a condition setting such as data update is performed, and a timing which is specified by the host 200 etc.

In the generation management, after generation information 33 as well as the actual device identification information 32 is added per actual device address 31 to the actual device address identification table 42 shown in FIG. 9, each generation of the actual device is managed accordingly. The generation information 33 is a generation number, a TOD (time of the day) information, or the like. In the table 42 of the storage apparatus 100, the generation information 33 is assigned to the same virtual device address 23 in units of generation saving. The actual device of each generation is saved in the storage area on the side of the HDD 30 and managed. For this reason, the controller 10 can access a actual device of a particular generation in accordance with a combination of the actual device address 31 and the generation information 33. By specifying the generation information 33 and making the virtual device access, a actual device of a specified generation can be accessed from the side of the host 200.

FIG. 18 is a setting example of the tables 41 and 42 in the SM 12 when generation management corresponding to FIG. 17 is made. By the device mounting in the tables 41 and 42 in the SM 12, the actual device address "a" is mapped to the virtual device address "0" and the actual device identification information "DevA" is assigned thereto by the host 200. In the table 42, generation numbers {0, 1, 2, . . . , g} that are different in units of generation saving are assigned to the actual device address "a" and managed.

In FIG. 17, for example, when the generation numbers and the time (TOD information) of each generation corresponding to the data update, the time, or the like used as the opportunity of the generation saving are set respectively to {0, 1, . . . , g} and {t0, t1, . . . , tg}, the actual device "Ag" of a gth generation is identified by specifying information on the combination of the actual device address "a" and the generation information "g" or "tg". The actual device "Ag" of the particular generation can be accessed from the side of the host 200 in accordance with the information "ag" on the combination of the virtual device address "0" and the generation information "g" or "tg".

Even when the present generation management is made, for example, the actual device of the specified generation can also be mounted to the particular virtual device so as to be available on the side of the host 200, by performing the command process such as the mounting-request-command process in the controller 10 similarly to the first embodiment. In this case, for example, in performing the mounting process based on the issuing of the command from the host 200, by using the actual device identification information 32 and the generation information 33 to which the mounting request instruction is given, the CHA 11 searches the actual device identification information 32 and the generation information 33 in the actual device address identification table 42, and seeks the corresponding actual device address 31 so as to perform the device mounting. In the case of making this generation management, it is convenient for the actual device of each generation to be accessible from the side of the host 200 by specifying the same virtual device address 23.

Third Embodiment

<Logical Partition>

Figure 19:
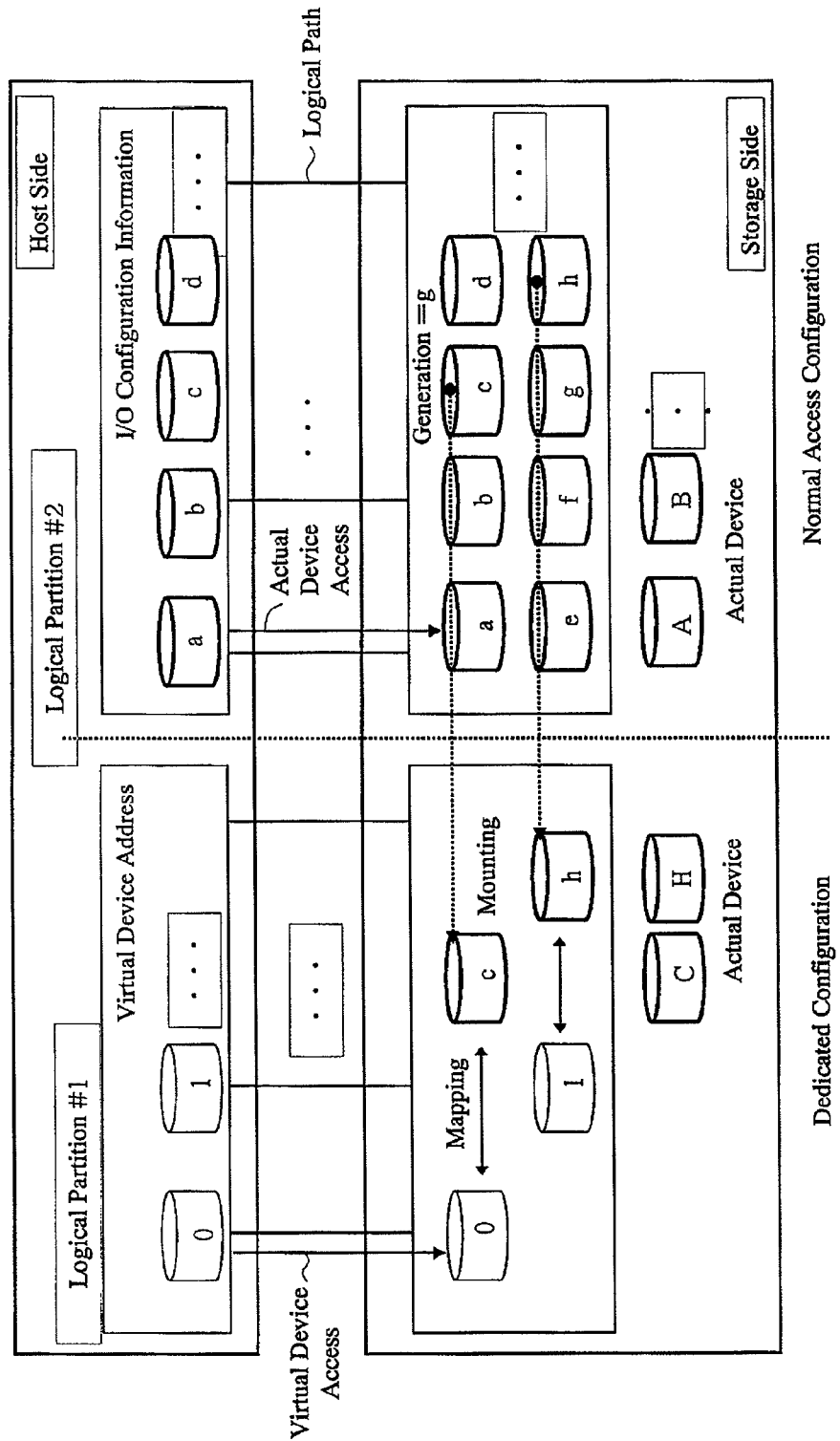
FIG. 19 is an explanatory diagram for showing a device mounting method in a storage apparatus according to a third embodiment of the present invention.

Next, a storage apparatus according to a third embodiment of the present invention has the configuration of the first embodiment and further sets logical partitions of the virtual devices to be objects, thereby making a use dedicated etc. to the virtual devices corresponding to the logical partitions. The hardware configuration thereof is the same as that of the first embodiment. FIG. 19 is an explanatory diagram of a device mounting method employed in the storage apparatus of the third embodiment.

By setting the logical partitions on the side of the host 200, resources such as processors of the host 200 are used by partitioning. The configuration is made so that the I/O configuration information corresponding to each of the logical partitions is retained on the side of the host 200, and the devices to be processing objects by each logical partition are set. The command processes or the like are the same as those in the above-described embodiments. Accordingly, device accesses can be independently made for different use applications in the respective logical partitions. In the present configuration, as the I/O configuration information, the number of device addresses employed in the logical partitions is controlled on the host side.

For example, the logical partitions #1 and #2 are set on the side of the host 200. In the logical partition #2, the device mounting corresponding to the normal access configuration is performed. Theses correspond to the conventional configuration definition and device using method. That is, in the logical partition #2 on the side of the host 200, the actual device addresses on the side of the storage apparatus 100 are provided one-on-one without modification, or the actual device addresses are provided, as the I/O configuration information so as to correspond one-on-one to the virtual device addresses 23. There is in form of a process for being accessed one-to-one by the actual device addresses {a, b, . . . }, from the processor corresponding to the logical partition #2 in the host 200 to the actual devices {A, B, . . . } on the side of the storage apparatus 100.

Meanwhile, in the logical partition #1 of the host 200, a device mounting corresponding to the dedicated configuration is performed. In the logical partition #1, a part of the actual devices is mounted to the virtual devices, and further accesses to the actual devices on the side of the storage apparatus 100 from the processor corresponding to the logical partition #1 are made by specifying the virtual device addresses 23. On the side of the storage apparatus 100, the addresses are obtained based on the information of the above-described tables 41 and 42, and the actual devices are accessed according to the actual device addresses 31. For example, the configuration is made so that the actual devices {C, H} among the actual devices {A, B, . . . } are subjected to the dedicated use by the device mounting performed in the logical partition #1. By the same mounting process as that of the first embodiment, the actual device addresses "c" and "h" are mapped to the virtual device addresses "0" and "1", respectively. Then, independently of the side of the logical partition #2, the processor corresponding to the logical partition #1 of the host 200 utilizes two virtual devices identified by the virtual device addresses "0" and "1" by making dedicated access (virtual device access) thereto. As for a use of the configuration corresponding to such logical partitions, for example, a side of the logical partition corresponding to the virtual device access is subjected to a high-speed access use or a backup-process dedicated use.

Note that, in the configuration corresponding to this logical partition, a device common to a plurality of logical partitions, e.g., the actual devices {C, H} of FIG. 19 can be in principle accessed concurrently from the logical partitions (#1, #2) on the side of the host 200. Whether the simultaneous access to the actual devices is permitted etc. depends on the utilizing configuration. For example, in the case of the backup-process use, the control is executed by employing such a predetermined copying method that the data consistency is ensured between the backup-processing-object actual device and the normal-access-object actual device.

<High-Speed Access Use>

By way of an example of a configuration corresponding to the above-described logical partitions, in the logical partition corresponding to the virtual device accesses, definitions (device mounting and retainment of the I/O configuration information) are given by to a parallel access volume (PAV) configuration, whereby the defined virtual devices are utilized in a high-speed access use. The PAV configuration is well known. Accordingly, the actual devices mounted in this configuration can be subjected to a high-speed process by accessing thereto in parallel from the side of the host 200.

Figure 20A:
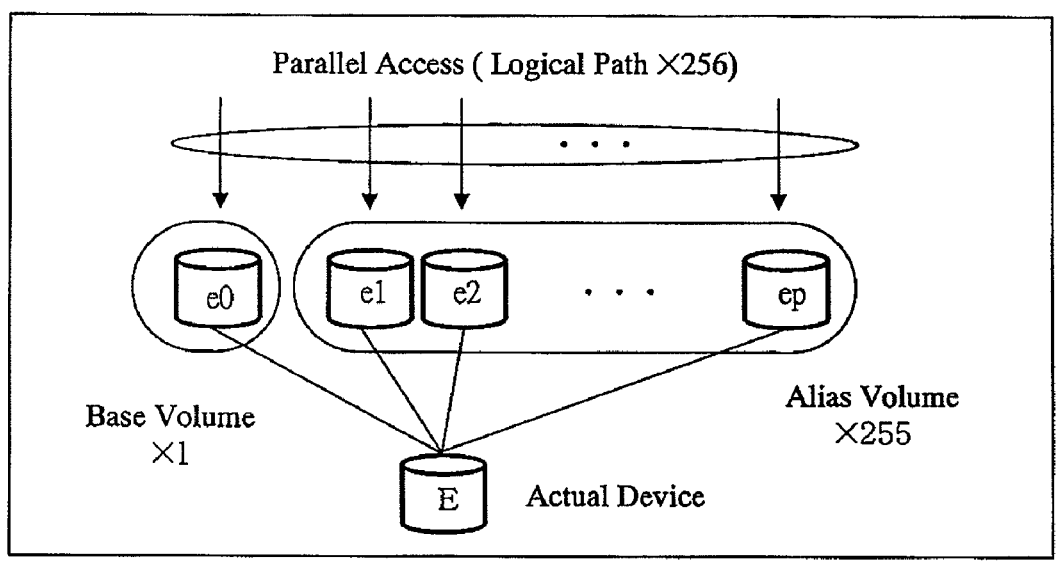
FIG. 20A is an explanatory diagram for showing a PAV configuration example in a storage apparatus of a third embodiment of the present invention.
Figure 20B:
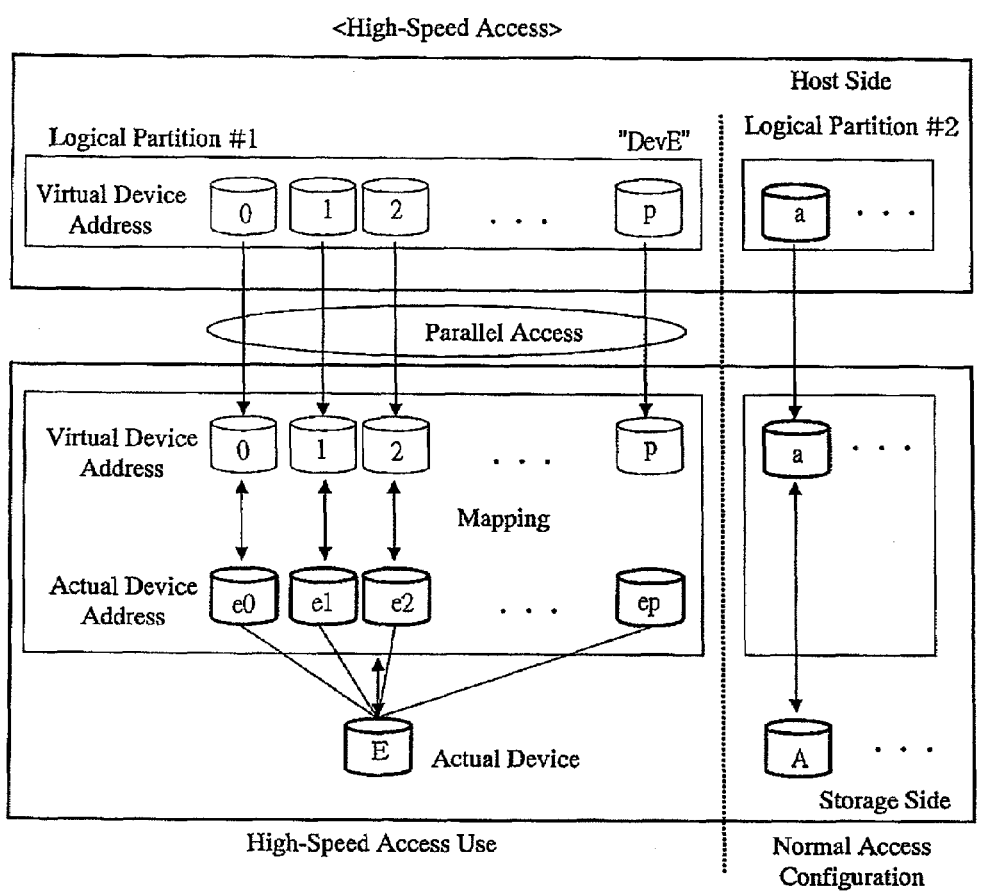
FIG. 20B is an explanatory diagram for showing a configuration example for high-speed access use in a storage apparatus of a third embodiment of the present invention.

FIGS. 20A and 20B are explanatory diagrams for showing a PAV configuration example and a configuration example for a high-speed access use. The PAV configuration example of FIG. 20A has such a configuration, as a PAV configuration regarding a certain actual device (for example, actual device "E"), that a base is one volume and an aliases is 255 volumes and the parallel access to the 256 volumes can be made therein. In order to parallel-access the device "E" from the side of the host 200, a base volume (device address "e0") corresponding to the device "E" and 255 alias volumes (device addresses "e1" to "ep") corresponding to the base volumes are set. In order to parallel-access the respective volumes, an independent logical path is set per volume. In this configuration, so as to make accesses by specifying the corresponding device addresses, the parallel access to the actual device "E" can be made.

In the configuration of FIG. 20B, the logical partition corresponding to the virtual device access is defined based on the above-described PAV configuration. For example, in setting the logical partition #1, regarding the actual device "E" in which the actual device identification information is "DevE", the host 200 defines, by the device mounting, a plurality of virtual device addresses 23 in accordance with the PAV configuration shown in FIG. 20B. By the mounting processes, the actual device addresses "e0" to "ep" are mapped to the respective virtual device addresses "0" to "p". The side of the logical partition #2 has a normal access configuration. Accordingly, since the parallel access to the actual device "E" can be made so as to correspond to each PAV, a high-speed processing of the actual device "E" to be an object can be performed. For example, if any of the actual devices provided in the storage apparatus 100 has a heavy load (the number of accesses) or is to be particularly subjected to a high-speed processing, the relevant actual device(s) is selected and utilized by defining a configuration corresponding to the above-described logical partition.

<Backup-dedicated Use>

By way of a configuration example corresponding to the above-described logical partition, in the logical partition corresponding to the virtual device access, the actual device to be an object of a back-up process in the storage apparatus 100 is defined based on the above-described dedicated configuration and utilized so as to be dedicated to the back-up process.

Figure 21:
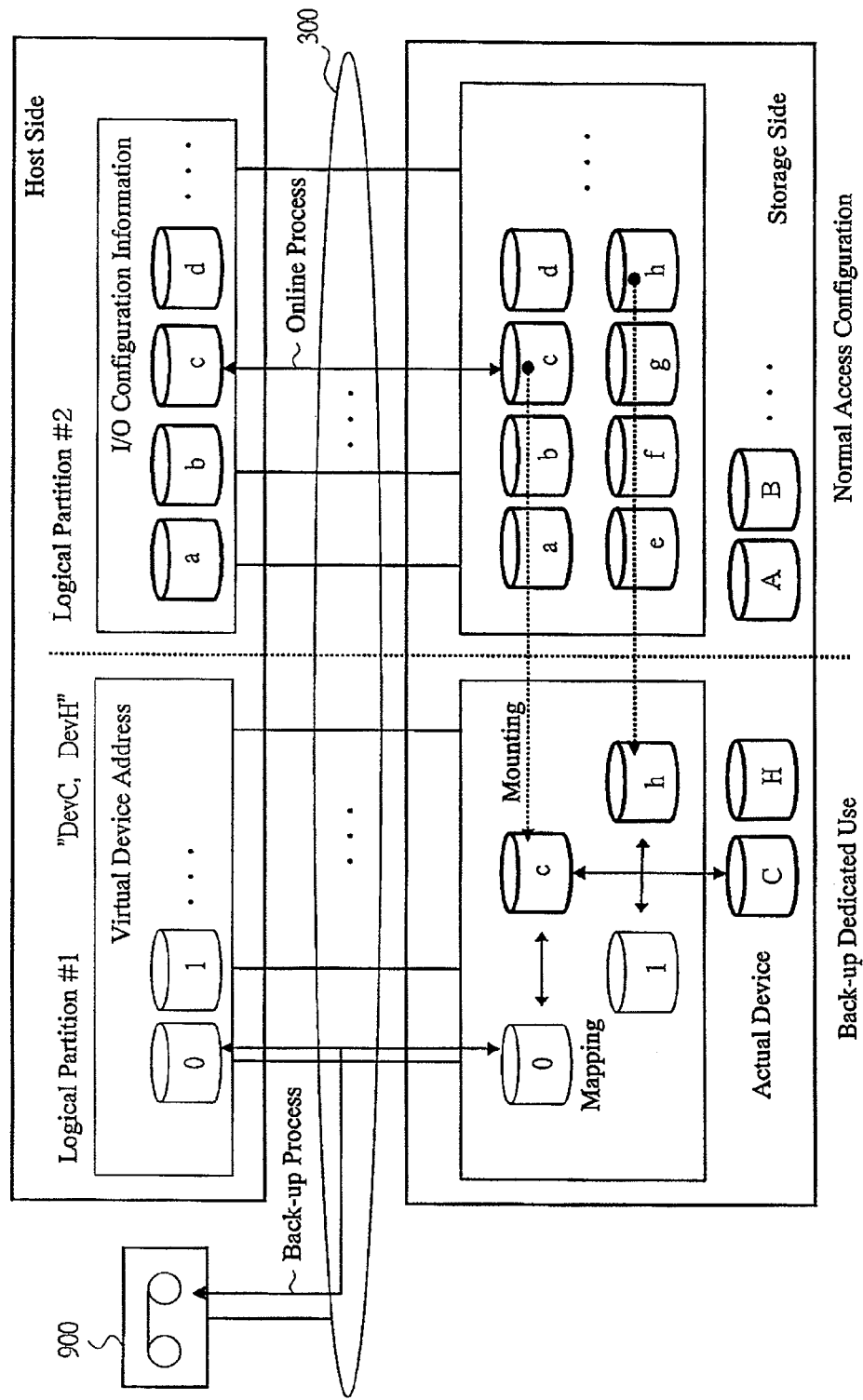
FIG. 21 is an explanatory diagram for showing a configuration example for a backup-dedicated use in a storage apparatus according to a third embodiment of the present invention.

FIG. 21 is an explanatory diagram for showing a configuration example for a backup-dedicated use. By setting of the logical partitions and the device mounting, the logical partition #2 is set to a normal access configuration and the logical partition #1 is set to a configuration dedicated to the back-up process. For example, in the logical partition #2, by the mounting process, the actual devices {C, H} are mounted to the virtual devices as the backup-processing-object actual devices. That is, the actual device addresses {c, h} are mapped to the virtual device addresses {0, 1}, respectively. Then, the host 200 performs online processes (processes executed by the above-described application program 20) by the normal access using the actual devices {A, B, . . . } of the side of the logical partition #2 and, concurrently, the host performs a back-up process by making the virtual device accesses to the virtual devices (actual devices {C, H}) on the side of the logical partition #1.

For example, when the back-up process is executed, the host 200 makes the virtual device access or requests a back-up process to the side of the logical partition #1 by specifying the virtual device address "0" with respect to the storage apparatus 100. Further, the CHA 11 of the storage apparatus 100 reads out (copies) the process-object data of the actual device "C" by use of the actual device address "c" corresponding to the virtual device address "0", and transfers the data to the magnetic tape unit 900 via a predetermined logical path. The magnetic tape unit 900 writes the transferred data to the area of the magnetic tape.

When the back-up process has been performed on the normal access configuration side (above-described logical partition #2) like the conventional one, the online process and the back-up process are mixed in the same logical path, whereby the performance of the online process is influenced. Meanwhile, when the present configuration is employed, it performs a process other than the online process, that is, a process by the back-up-process-dedicated logical path, so that the online process is not influenced due to no conflict in the logical path. Therefore, the dedicated access to the backup-processing-object actual device can be made so as to carry out an effective back-up process.

Note that, in the above-described back-up process, since the CHA 11 of the storage apparatus 100 communicates with the external device such as another storage apparatus 100 or the magnetic tape unit 900, copy etc. can be performed by reading out and transferring the data of the actual device to the external device. During the copy operation, even when the data is updated in a copy-source (primary) or copy-destination (secondary) actual device, control is executed so that the contents thereof are consistent with each other. For example, the conventional technique includes a synchronous copy and an asynchronous copy. In the synchronous copy, the update of the copy source and that of the copy destination are synchronized during the input/output from the host to the device. In the asynchronous method, the update of the copy source and that of the copy destination are not synchronized during the input/output from the host to the device, and bring the data contents into conformity (resynchronization) with delay in time.

Fourth Embodiment

<Cache-Resident Function>

Figure 22:
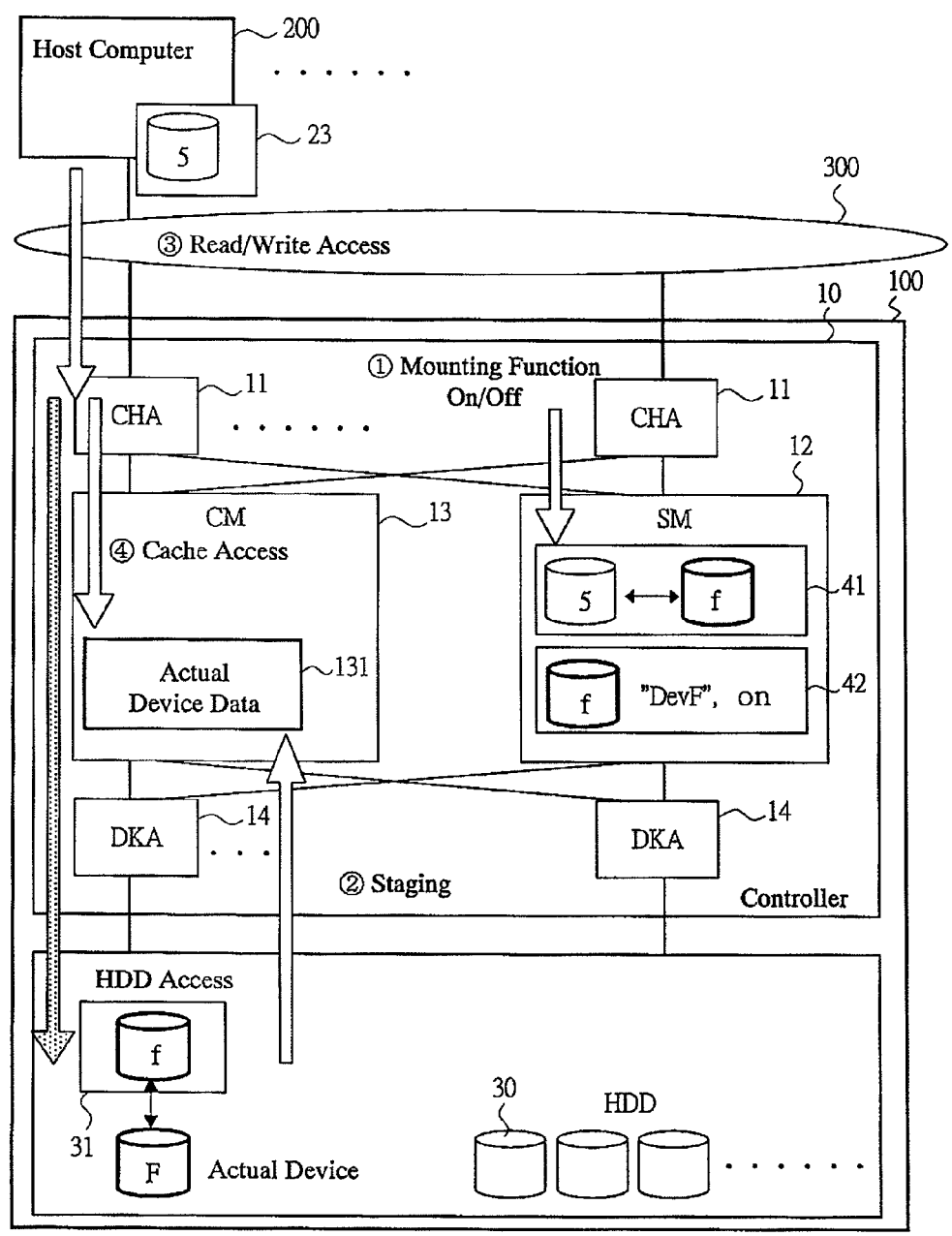
FIG. 22 is an explanatory diagram for showing a device mounting method in a storage apparatus according to a fourth embodiment of the present invention.

Next, a storage apparatus of a fourth embodiment has the configuration of the first embodiment and further assigns a cache-resident function to the virtual device address 23 so as to perform a cache-resident process. The hardware configuration is the same as that of the first embodiment. FIG. 22 is an explanatory diagram for showing a device mounting method in a storage apparatus of a fourth embodiment.

In the conventional configuration, when a cache-resident function is used in a system, a cache-resident function has been assigned to an equivalent of the actual device address 31. The conventional cache-resident function will be briefly described as follows. The storage apparatus has performed a process in which an actual device, to which cache residence is set (assigned), is used as an object, and the data of the object actual device is subjected to staging, i.e., data transfer to a memory such as a cache memory of a controller and is stored therein so as to be resident. Accordingly, when the host accesses the data of the object actual device, the controller is not required to make an access to a HDD as long as input/output of the data resident in the cache memory is executed. Therefore, the process relating to the object actual device becomes efficient. Meanwhile, when the cache-resident function regarding the object actual device is cancelled, there is performed a process in which the data of the object actual device is subjected to destaging, i.e., the data is transferred from the memory such as the cache memory of the controller to the storage area of the HDD and the data is stored therein.

In the fourth embodiment, the conventional cache-resident function is applied to the virtual device. The host 200 (or administration terminal 160 etc.) transmits, to the side of the storage apparatus 100, a request including the specification of the virtual device address 23 and the instruction to turn on/off the cache-resident function. The storage apparatus 100 performs on/off setting of the cache-resident function with respect to the object virtual device address 23 based on the instruction which have been given from the side of the host 200. Also, in the CM 13 of the controller 10, the storage apparatus sets and reserves a cache area corresponding to the cache-resident function.

The on/off settings of the cache-resident function are performed with respect to the object virtual device in accordance with, for example, the mounting or unmounting operation of the device. At the timing of the device mounting, the actual device data (cache data) 131 corresponding to the virtual device address 23 is staged from an area of the HDD 30 to the cache area that is set with the cache-resident function being on in the CM 13. Similarly, at the timing of the device unmounting, the actual device data 131 stored in the cache area in the CM 13 is destaged to the area of the HDD 30 corresponding to the actual device address 31.

In FIG. 22, for example, the host 200 issues a mounting request command including the specification of the virtual device address "5" and an instruction to turn on the cache-resident function. So as to correspond to the command, the CHA 11 on the side of the storage apparatus 100 performs, in the tables 41 and 42 in the SM 12, a setting for mounting the actual device "F" of the actual device address "f" corresponding to the virtual device address "5" specified from the side of the host 200, and is set to turn on the cache-resident function of the relevant actual device "F" in the table 42 etc. Then, the CHA 11 reads out the data (131) of the actual device "F" corresponding to the cache-resident-object virtual device from the side of the HDD 30 through a process of the DKA 14, and stores the data into the cache area reserved in the CM 13. When the input/output access such as read/write is made from the host 200 by specifying the virtual device address "5", the CHA 11 obtains the actual device address "f" corresponding to the specified virtual device address "5" by referring to the tables 41 and 42 in the SM 12 and the cache access to the corresponding cache area of the CM 13 is made and the input/output such as read/write is performed with respect to the corresponding actual device data 131. Also, the host 200 issues an unmounting request command including the specification of the virtual device address "5" and an instruction to turn off the cache-resident function. So as to correspond to the command, the CHA 11 on the side of the storage apparatus 100 performs, in the tables 41 and 42 in the SM 12, a setting for unmounting the actual device "F" of the actual device address "f" corresponding to the virtual device address "5" specified from the side of the host 200, and is set to turn off the cache-resident function of the relevant actual device "F" in the table 42 etc. Then, the CHA 11 reads out the data (131) of the actual device "F" from the cache area reserved in the CM 13 through the process of the DKA 14, and stores the data in the area of the HDD 30.

Thus, by applying the cache-resident function to the virtual device, the read/write data corresponding to the virtual device is made to be resident in the CM 13. Therefore, the high-speed process for employing the cache access specifying the virtual device address can be performed.

As described above, the inventions made by the present inventors have been described specifically based on the above embodiments. However, needless to say, the present invention is not limited to the above-mentioned embodiments and may be variously modified and altered without departing from the gist thereof.

The present invention can be utilized in a computer system etc. configured by including a first system (storage apparatus) retaining the storage volumes and a second system (e.g., host computer) communicably connected thereto and making the accesses to said storage volumes.

What we claim is:

1. A storage apparatus comprising:
   a storage unit; and
   a controller coupled to said storage unit,
   wherein control of inputting/outputting data from/to a device provided in said storage unit is executed in accordance with a request received by said storage apparatus,
   wherein an actual device of the storage apparatus corresponds to a virtual device which is external to said storage apparatus, and
   wherein said controller performs:
   a process for mapping an actual device address corresponding to a virtual device address of said virtual device, in accordance with a specification of the actual device to be mounted or unmounted to correspond to said virtual device, and storing and retaining mapping information obtained from the mapping in a first table; and a data input/output process for receiving, an access request for data input/output in which said virtual device address is specified, obtaining the actual device address mapped to said specified virtual device address in said first table, and accessing the actual device by said obtained actual device address, wherein said controller performs a mounting process corresponding to a mounting request received by said storage apparatus including the specification of the virtual device address, and an unmounting process corresponding to an unmounting request received by said storage apparatus including the specification of said virtual device address, wherein said mounting process is a process for searching the actual device address corresponding to said specified virtual device address, and mapping said searched actual device address to said specified virtual device address in said first table, and, wherein said unmounting process is a process for nullifying the mapping of the actual device address to said specified virtual device address in said first table.

2. The storage apparatus according to claim 1,
wherein said controller performs, based on a mounting-information displaying request received by said storage apparatus, a process for reading out information from said first table and a second table, and transmitting the information outside of said storage apparatus.

3. The storage apparatus according to claim 1,
wherein said controller performs a mounting process corresponding to the mounting request including the specification of said virtual device address and said actual device identification information received by said storage apparatus, and correlating said actual device address and the actual device identification information so as to be stored and retained in a second table, and, said mounting process is a process for searching the actual device address from said second table with respect to said specified actual device identification information, and mapping said searched actual device address to said specified virtual device address in said first table.

4. The storage apparatus according to claim 3,
wherein said controller comprises:
a channel adapter for performing a communication interface process with external devices;
a shared memory for storing control information;
a cache memory for storing data; and
a disk adapter for performing a data input/output process to a storage unit side, in which said first and second tables are retained in said shared memory, data for data input/output with respect to said virtual device is stored in said cache memory, and a data input/output accesses of the actual device address to said actual device is made by said disk adapter, and said channel adapter receives said mounting request and said unmounting request from outside of said storage apparatus and the access request for said data input/output, and refers to the first and the second tables in said shared memory and concurrently performs said data input/output process through said mounting process, the unmounting process, and a process by said disk adapter.

5. The storage apparatus according to claim 4,
wherein said controller retains said first and second tables in said shared memory during an operation of the storage apparatus, saves information of said first and second tables in a system area of said storage unit at an arbitrary timing, and loads said first and second tables from the system area of said storage unit onto said shared memory so as to be reconstructed.

6. The storage apparatus according to claim 1,
wherein said controller saves data of said actual device on a side of the storage unit per a generation saving unit, controls generation information corresponds to said generation saving unit so as to be correlated with said actual device address, and accesses data of the actual device in particular generation based on specification of said actual device address and the generation information.

7. The storage apparatus according to claim 1,
said controller performs, so as to correspond to a logical partition received by said storage apparatus, a mounting of said virtual device and the actual device in a parallel access volume configuration.

8. The storage apparatus according to claim 1,
said controller performs, so as to correspond to a logical partition received by said storage apparatus, a mounting of said virtual device and the actual device in accordance with a backup-process-dedicated configuration regarding said virtual device.

9. The storage apparatus according to claim 1,
wherein said controller performs, based on a request received by said storage apparatus, a process for setting a cache-resident function on the specified virtual device address, stores, into an area of the cache memory, data of the actual device corresponding to the virtual device on which said cache-resident function has been set, and performs the data input/output to the data of the actual device in the cache memory by the data input/output process.

* * * * *